(12) United States Patent
Nagatomi et al.

(10) Patent No.: US 8,358,571 B2
(45) Date of Patent: Jan. 22, 2013

(54) OPTICAL PICKUP DEVICE

(75) Inventors: Kenji Nagatomi, Kaizu (JP); Shinsei Kasahara, Ota (JP); Shigeharu Shirane, Kumagaya (JP); Masayuki Yoshie, Oizumi-Machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/191,794

(22) Filed: Jul. 27, 2011

(65) Prior Publication Data
US 2012/0026858 A1 Feb. 2, 2012

(30) Foreign Application Priority Data

Jul. 30, 2010 (JP) ................................ 2010-172207

(51) Int. Cl.
*G11B 7/00* (2006.01)
(52) U.S. Cl. ......... 369/112.22; 369/112.01; 369/112.28; 369/44.23
(58) Field of Classification Search ............... 369/44.23, 369/44.41, 44.42, 112.01, 112.09, 112.14, 369/112.21, 112.22, 112.28, 44.24
See application file for complete search history.

(56) References Cited

U.S. PATENT DOCUMENTS

| | | | |
|---|---|---|---|
| 2002/0048233 A1* | 4/2002 | Ogasawara et al. | 369/44.23 |
| 2009/0201787 A1* | 8/2009 | Ogasawara et al. | 369/112.23 |
| 2009/0278029 A1* | 11/2009 | Ogasawara et al. | 250/201.5 |
| 2010/0027386 A1* | 2/2010 | Nagatomi et al. | 369/44.32 |
| 2010/0027404 A1* | 2/2010 | Nagatomi et al. | 369/112.23 |
| 2010/0027405 A1* | 2/2010 | Nagatomi et al. | 369/112.23 |
| 2010/0177619 A1* | 7/2010 | Sato et al. | 369/112.23 |
| 2010/0271926 A1* | 10/2010 | Nagatomi | 369/112.23 |
| 2010/0329102 A1* | 12/2010 | Nagatomi | 369/112.23 |
| 2011/0026382 A1* | 2/2011 | Kanai et al. | 369/112.23 |
| 2011/0051590 A1* | 3/2011 | Nagatomi | 369/112.23 |
| 2011/0075544 A1* | 3/2011 | Nagatomi | 369/112.23 |
| 2011/0075545 A1* | 3/2011 | Nagatomi et al. | 369/112.23 |

FOREIGN PATENT DOCUMENTS

| | | |
|---|---|---|
| JP | 2006-73042 A | 3/2006 |
| JP | 2009-211770 A | 9/2009 |

* cited by examiner

*Primary Examiner* — Thang Tran
(74) *Attorney, Agent, or Firm* — Ditthavong Mori & Steiner, P.C.

(57) ABSTRACT

An optical pickup device has an astigmatism element which imparts astigmatism to reflected light of laser light reflected on a recording layer, and a spectral element into which the reflected light is entered, and which separates the reflected light. The spectral element is divided into four third areas by a first area having a certain width and formed along a straight line in parallel to a first direction, and by a second area having a certain width and formed along a straight line in parallel to a second direction. The spectral element is configured to guide the reflected light passing through the four third areas to respective corresponding sensors on a photodetector while making propagating directions of the reflected light different from each other, and to avoid guiding the reflected light entered into the first area and into the second area to the sensors.

6 Claims, 19 Drawing Sheets

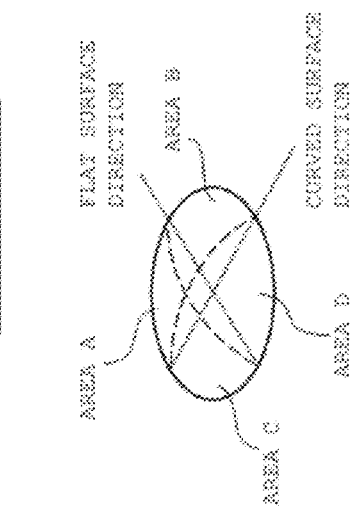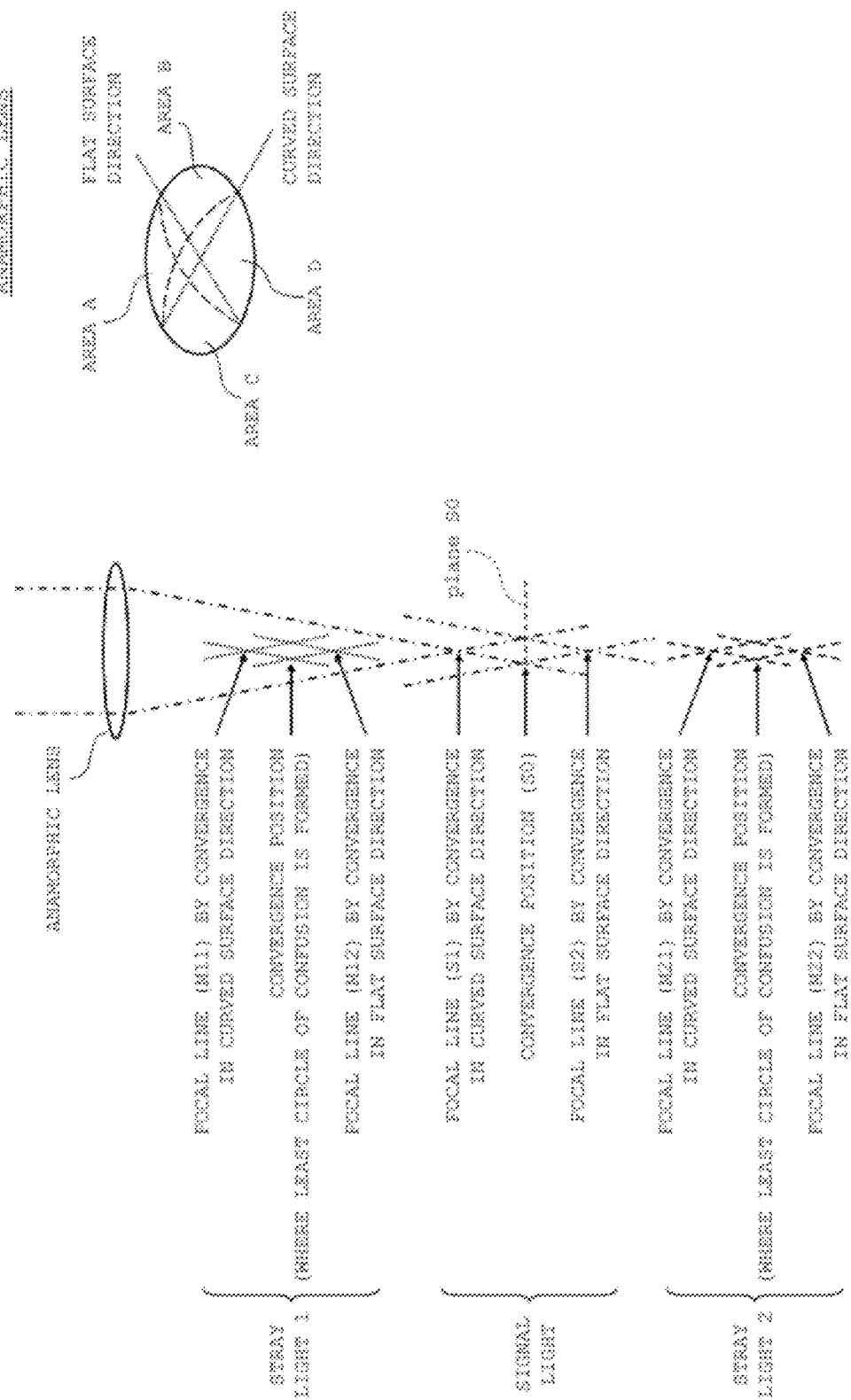

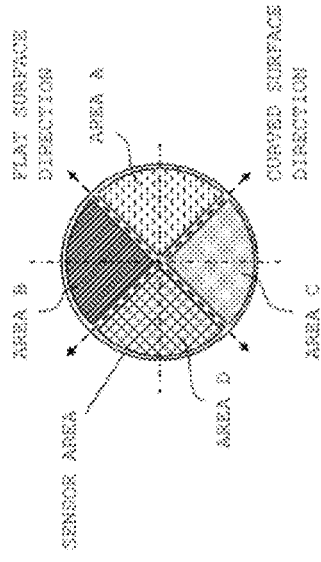
FIG. 2A  LIGHT FLUX DIVIDING PATTERN
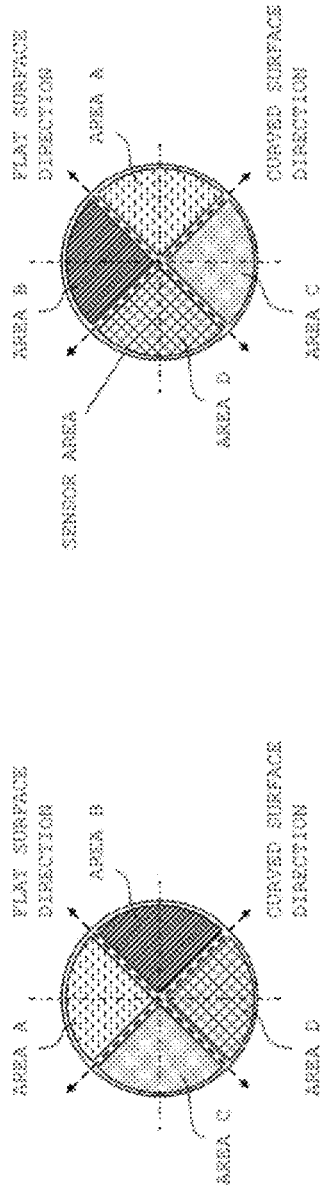
FIG. 2B  SIGNAL LIGHT
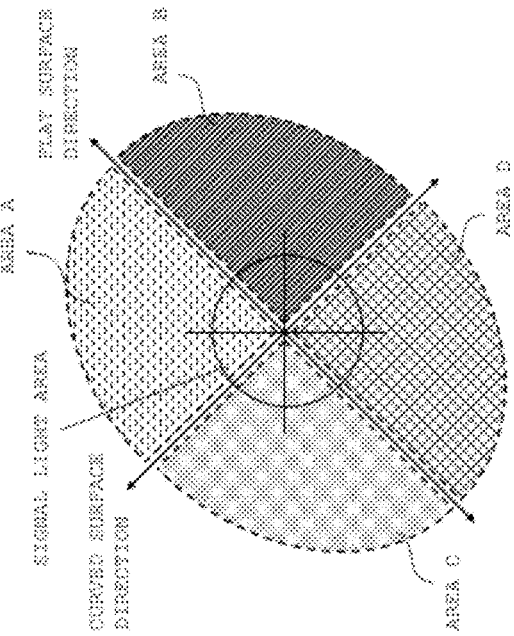
FIG. 2C  STRAY LIGHT 1
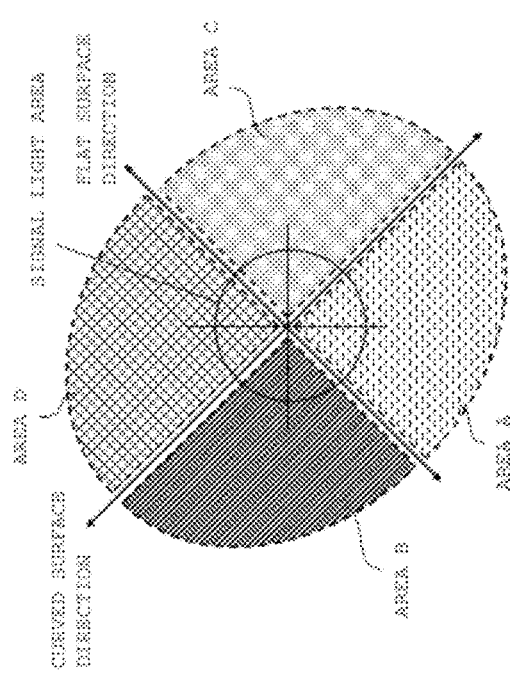
FIG. 2D  STRAY LIGHT 2

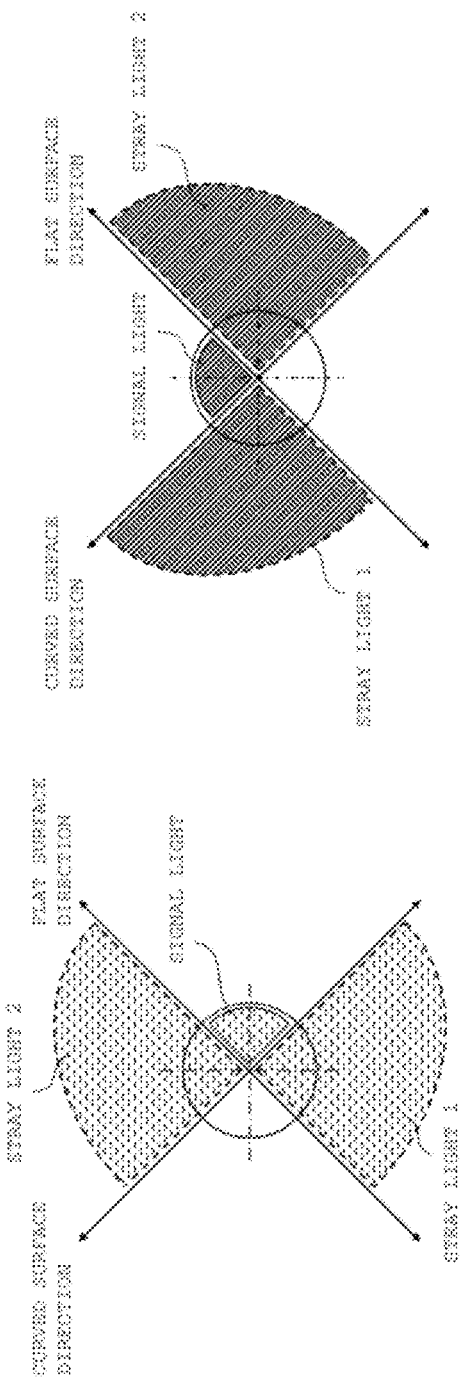
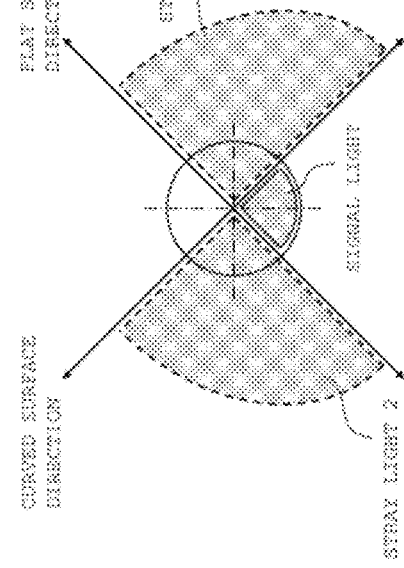
FIG. 3A LIGHT FLUX STATE IN AREA A
FIG. 3B LIGHT FLUX STATE IN AREA B
FIG. 3C LIGHT FLUX STATE IN AREA C
FIG. 3D LIGHT FLUX STATE IN AREA D

LIGHT FLUX ON PLANE 80

PROVIDE ANGULAR CHANGE TO EACH AREA

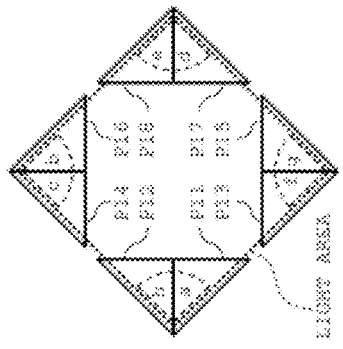
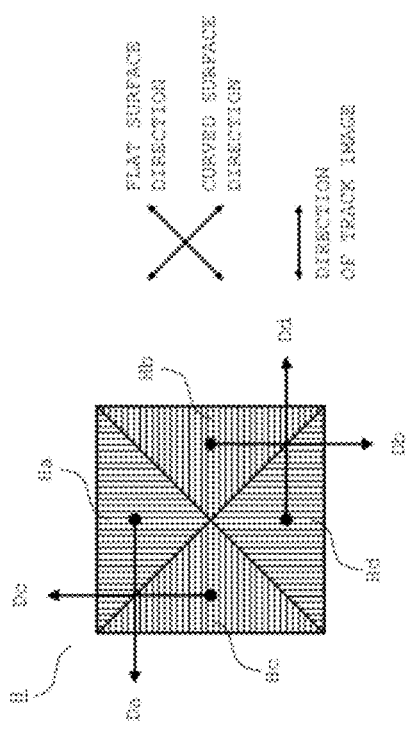
FIG. 7A
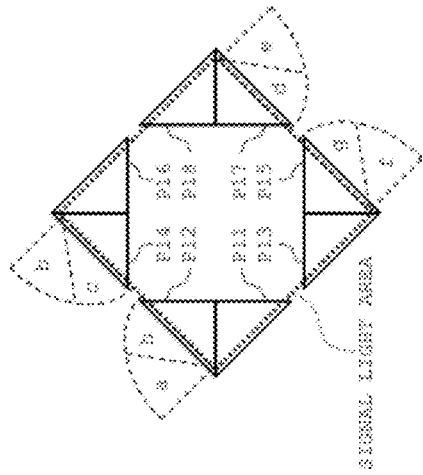
FIG. 7B SIGNAL LIGHT
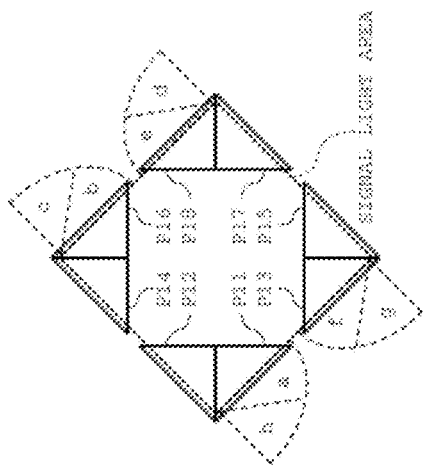
FIG. 7C STRAY LIGHT 1
FIG. 7D STRAY LIGHT 2

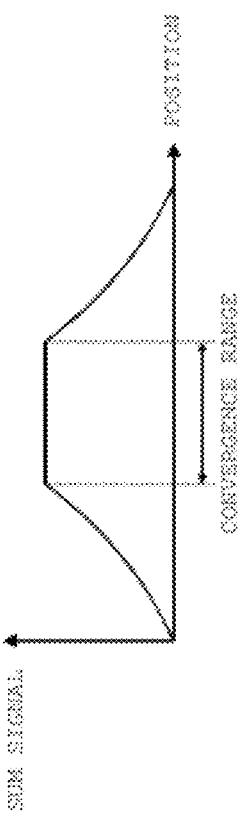
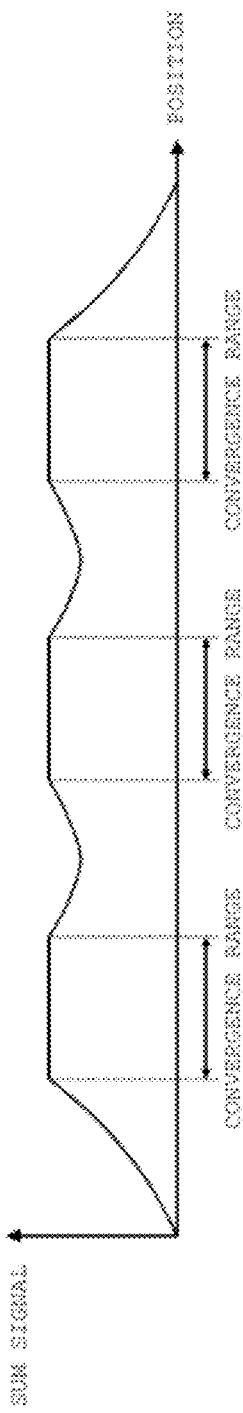
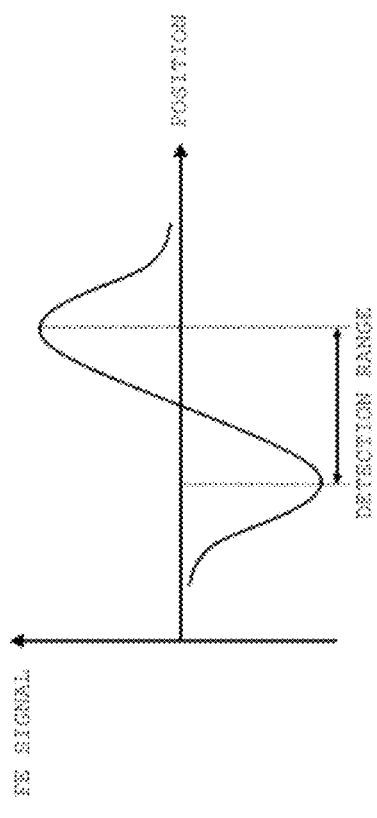
FIG. 9A SUM SIGNAL
FIG. 9B SUM SIGNAL
FIG. 9C FE SIGNAL

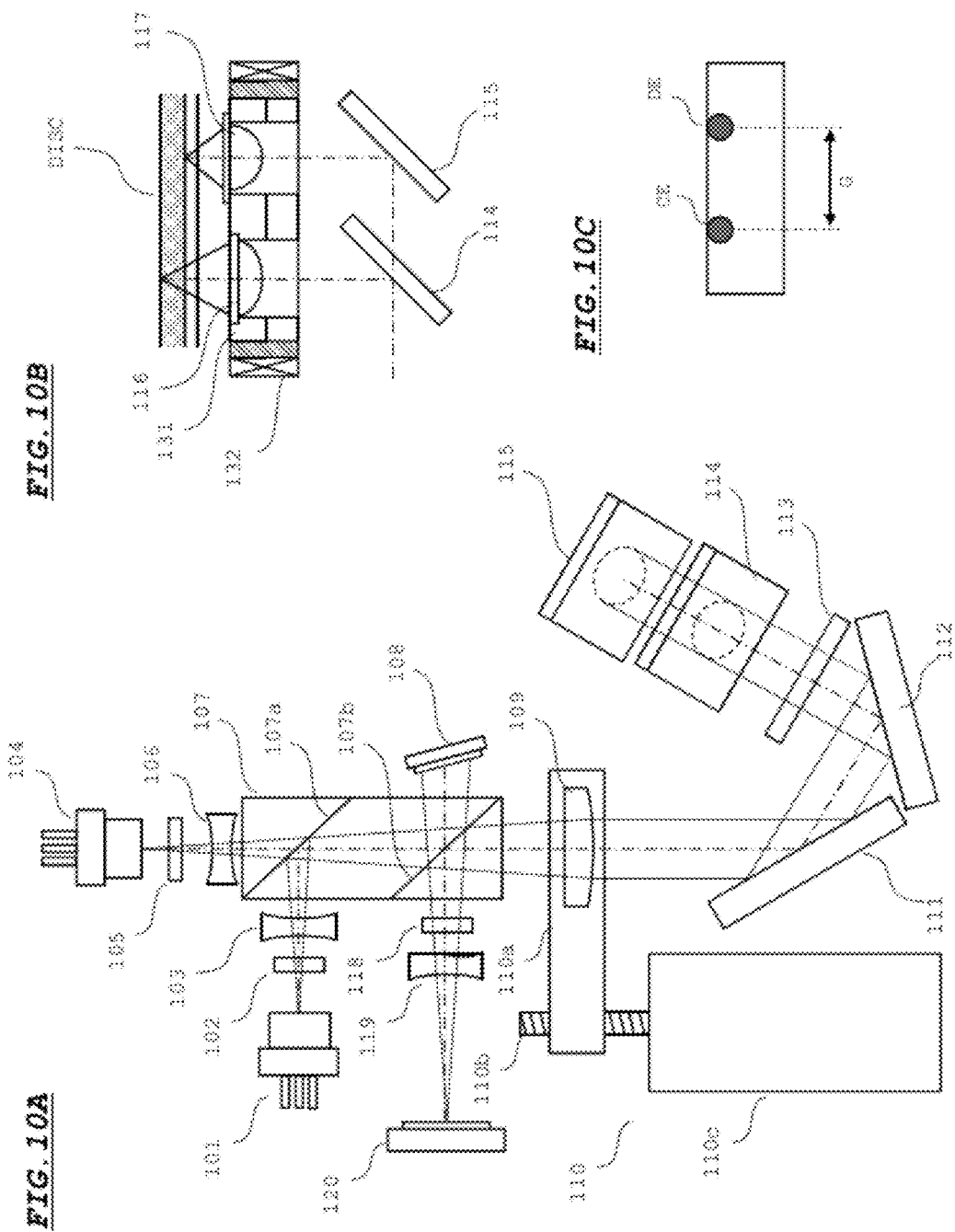

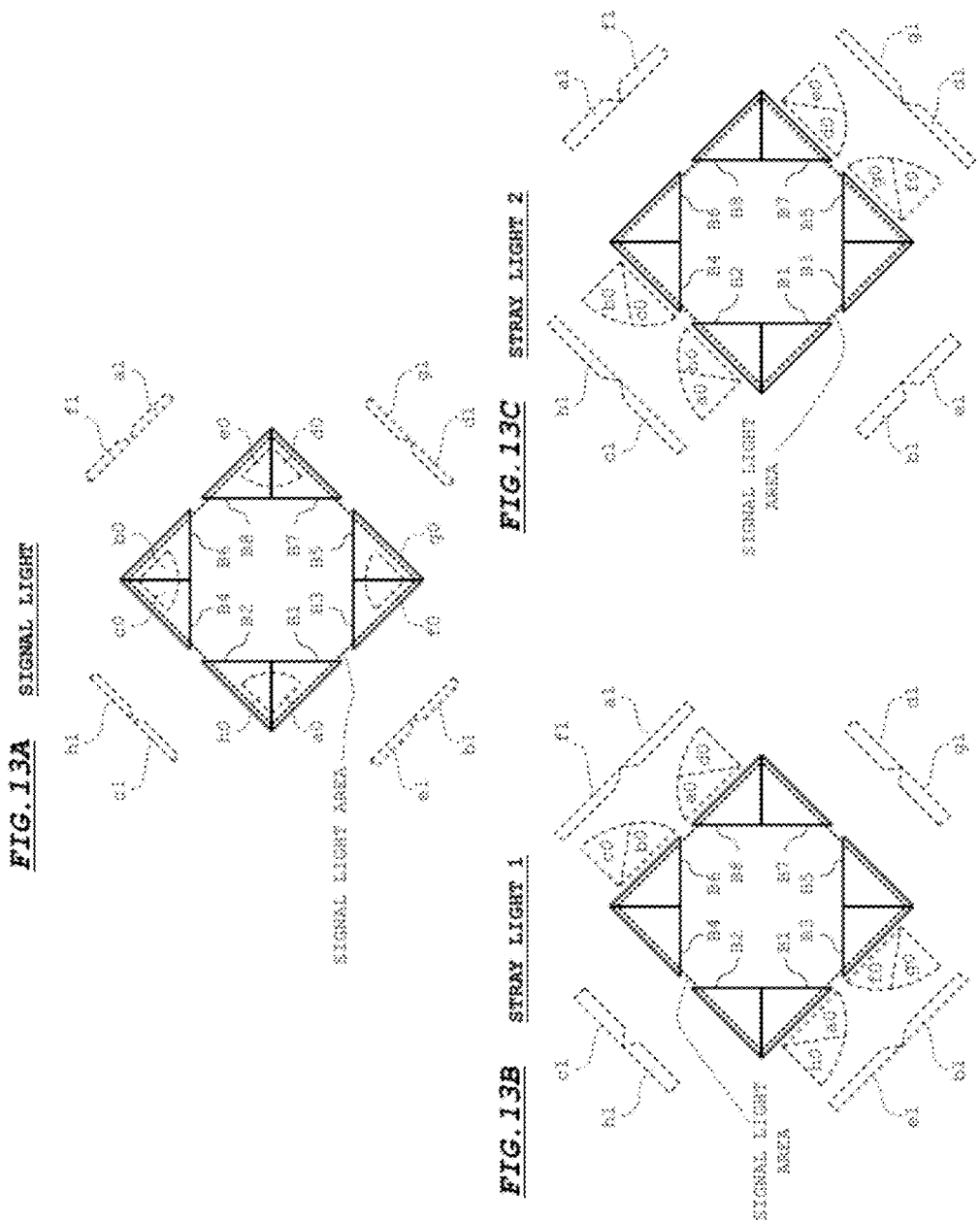

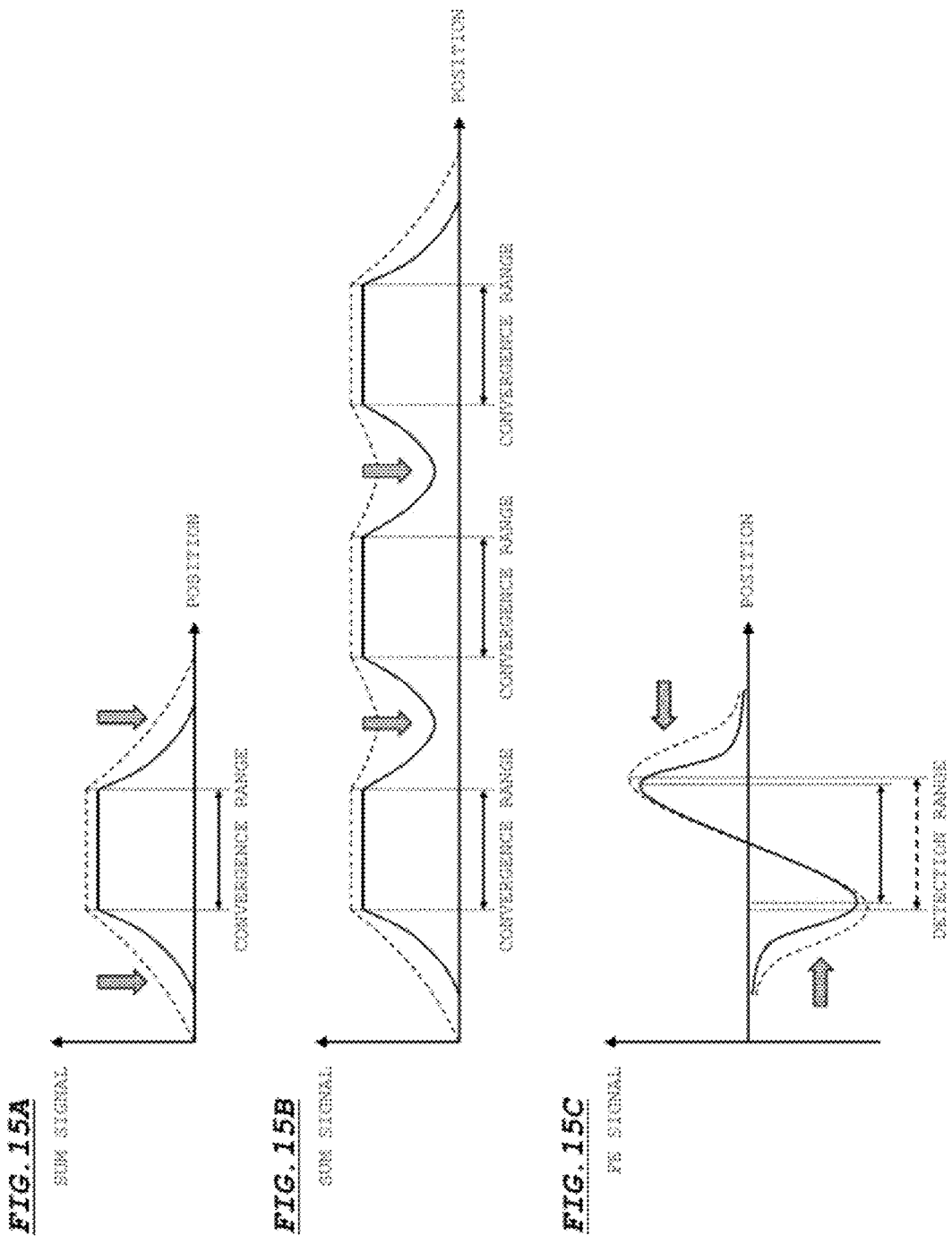

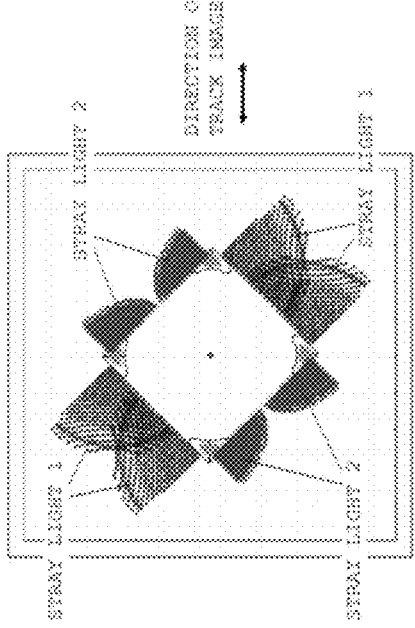
FIG. 16A  SPECTRAL ELEMENT H (WITHOUT LENS SHIFT)
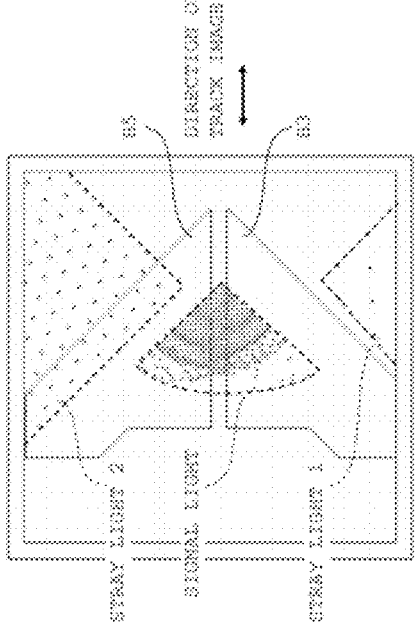
FIG. 16C  SPECTRAL ELEMENT 118 (WITHOUT LENS SHIFT)
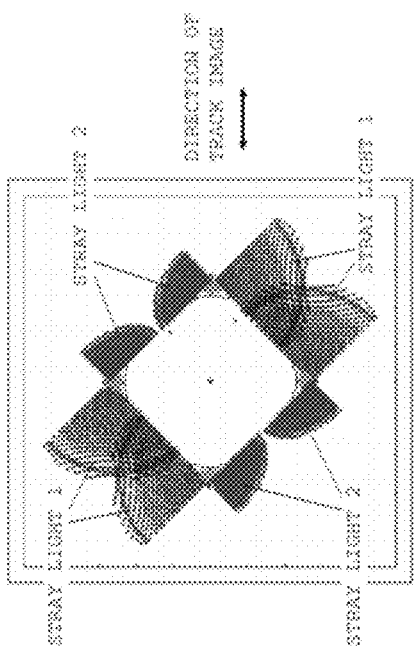
FIG. 16B  SPECTRAL ELEMENT H (WITHOUT LENS SHIFT)
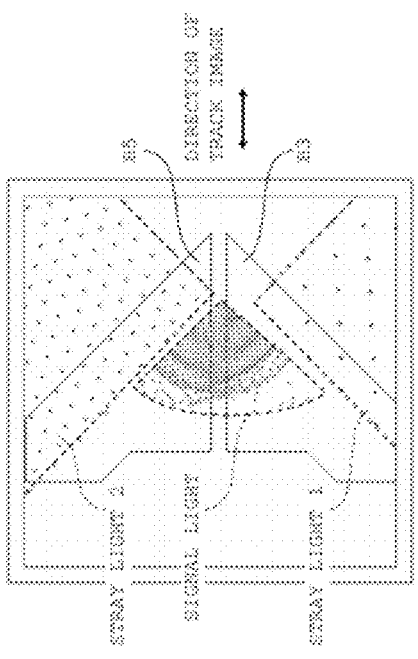
FIG. 16D  SPECTRAL ELEMENT 118 (WITHOUT LENS SHIFT)

OPTICAL PICKUP DEVICE

This application claims priority under 35 U.S.C. Section 119 of Japanese Patent Application No. 2010-172207 filed Jul. 30, 2010, entitled "OPTICAL PICKUP DEVICE". The disclosure of the above applications is incorporated herein by reference.

BACKGROUND OF THE INVENTION

1. Technical Field of the Invention

The invention relates to an optical pickup device, and more particularly to an optical pickup device suitable for use in irradiating a recording medium having plural laminated recording layers with laser light.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

Japanese Unexamined Patent Publication No. 2009-211770 (corresponding to U.S. Patent Application Publication No. US2009/0225645 A1) discloses a novel arrangement of an optical pickup device operable to properly remove stray light, in the case where a large number of recording layers are formed. With this arrangement, it is possible to form an area where only signal light exists, on a light receiving surface of a photodetector. By disposing a sensor of the photodetector in the above area, it is possible to suppress an influence on a detection signal resulting from stray light.

In the above optical pickup device, an area onto which signal light is irradiated, and an area onto which stray light is irradiated are adjacent to each other. As a result, even if a sensor is disposed in an area where only signal light exists, a part of stray light may be entered into the sensor, which may degrade the precision of a detection signal. Further, in the above optical pickup device, if a disc having a small distance between adjacent recording layers is used, it is difficult to determine an S-shaped curve in focus servo control, which makes it difficult to determine a target recording layer.

SUMMARY OF THE INVENTION

A main aspect of the invention relates to an optical pickup device. The optical pickup device according to the main aspect includes a light source which emits laser light; an objective lens which focuses the laser light on a recording layer; an astigmatism element which imparts astigmatism to reflected light of the laser light reflected on the recording layer; a spectral element into which the reflected light is entered, and which separates the reflected light; and a photodetector which receives the reflected light. In the above arrangement, the astigmatism element converges the reflected light in a first direction and in a second direction perpendicular to the first direction so that the reflected light forms focal lines at different positions from each other. The spectral element is divided into four third areas by a first area having a certain width and formed along a straight line in parallel to the first direction, and by a second area having a certain width and formed along a straight line in parallel to the second direction. The spectral element is configured to guide the reflected light passing through the four third areas to respective corresponding sensors on the photodetector while making propagating directions of the reflected light different from each other, and to avoid guiding the reflected light entered into the first area and into the second area to the sensors.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays converge) in an embodiment of the invention.

FIGS. 2A through 2D are diagrams for describing the technical principle (as to how light fluxes are distributed) in the embodiment.

FIGS. 3A through 3D are diagrams for describing the technical principle (as to how signal light and stray light are distributed) in the embodiment.

FIGS. 7A through 7D are schematic diagrams showing an arrangement of a spectral element based on the technical principle of the embodiment, and an irradiation area in the case where the spectral element is used.

FIGS. 9A through 9C are schematic diagrams showing a SUM signal and a focus error signal, in the case where the spectral element based on the technical principle of the embodiment is used.

FIGS. 10A through 10C are diagrams showing an optical system of an optical pickup device in an inventive example.

FIGS. 13A through 13C are schematic diagrams showing irradiation areas in the inventive example.

FIGS. 15A through 15C are schematic diagrams showing a SUM signal and a focus error signal in the inventive example.

FIGS. 16A through 16D are diagrams showing a simulation result, in the case where the spectral element based on the technical principle of the embodiment is used, and in the case where the spectral element in the inventive example is used.

Figure 4B:
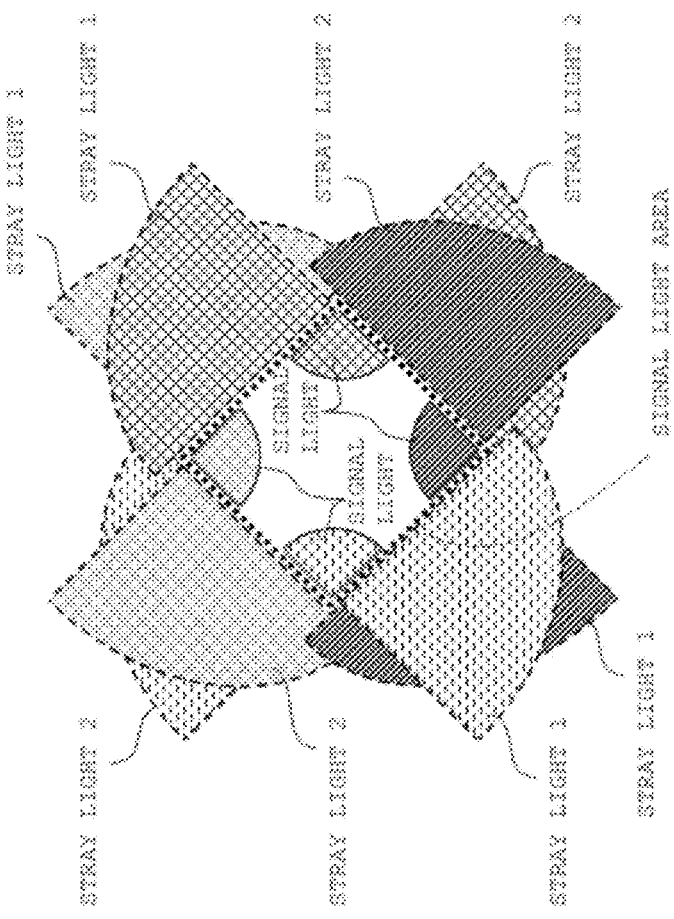
FIGS. 4A and 4B are diagrams for describing the technical principle (a method for separating light fluxes) in the embodiment.

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 6.

FIG. 1A is a diagram showing a state as to how light rays are converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the lens optical axis, in a curved surface direction and a flat surface direction. The curved surface direction and the flat surface direction intersect perpendicularly to each other. Further, the curved surface direction has a smaller radius of curvature than that of the flat surface direction, and has a greater effect of converging laser light to be entered into the anamorphic lens.

To simplify the description on the astigmatism function of the anamorphic lens, the terms "curved surface direction" and "flat surface direction" are used. Actually, however, as far as the anamorphic lens has a function of forming focal lines at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" may be a straight line shape (where the radius of curvature=∞).

Referring to FIG. 1A, signal light converged by the anamorphic lens forms focal lines at different positions from each other by convergence in the curved surface direction and in the flat surface direction. The focal line position (S1) of signal light by convergence in the curved surface direction is close to the anamorphic lens than the focal line position (S2) of signal light by convergence in the flat surface direction, and the convergence position (S0) of signal light is an intermediate position between the focal line positions (S1) and (S2) by convergence in the curved surface direction and in the flat surface direction.

Similarly to the above, the focal line position (M11) of stray light 1 converged by the anamorphic lens by convergence in the curved surface direction is close to the anamorphic lens than the focal line position (M12) of stray light 1 by convergence in the flat surface direction. The anamorphic lens is designed to make the focal line position (M12) of stray light 1 by convergence in the flat surface direction close to the anamorphic lens than the focal line position (S1) of signal light by convergence in the curved surface direction.

Similarly to the above, the focal line position (M21) of stray light 2 converged by the anamorphic lens in the curved surface direction is close to the anamorphic lens than the focal line position (M22) of stray light 2 by convergence in the flat surface direction. The anamorphic lens is designed to make the focal line position (M21) of stray light 2 by convergence in the curved surface direction away from the anamorphic lens than the focal line position (S2) of signal light by convergence in the flat surface direction.

Further, the beam spot of signal light has a shape of a least circle of confusion on the convergence position (S0) between the focal line position (S1) and the focal line position (S2).

Taking into account the above matters, the following is a description about a relationship between irradiation areas of signal light and stray light 1, 2 on the plane S0.

As shown in FIG. 2A, the anamorphic lens is divided into four areas A through D. In this case, signal light entered into the areas A through D is distributed on the plane S0, as shown in FIG. 2B. Further, stray light 1 entered into the areas A through D is distributed on the plane S0, as shown in FIG. 2C, and stray light 2 entered into the areas A through D is distributed on the plane S0, as shown in FIG. 2D.

If signal light and stray light 1, 2 on the plane S0 are extracted in each of light flux areas, the distributions of the respective light are as shown in FIGS. 3A through 3D. In this case, stray light 1 and stray light 2 in the same light flux area are not overlapped with signal light in each of the light flux areas. Accordingly, if the device is configured such that only signal light is received by a sensor after light fluxes (signal light, stray light 1, 2) in each of the light flux areas are separated in different directions, only signal light is entered into a corresponding sensor to thereby suppress incidence of stray light. Thus, it is possible to avoid degradation of a detection signal resulting from stray light.

As described above, it is possible to extract only signal light by dispersing and separating light passing through the areas A through D from each other on the plane S0. The embodiment is made based on the above technical principle.

Figure 4A:
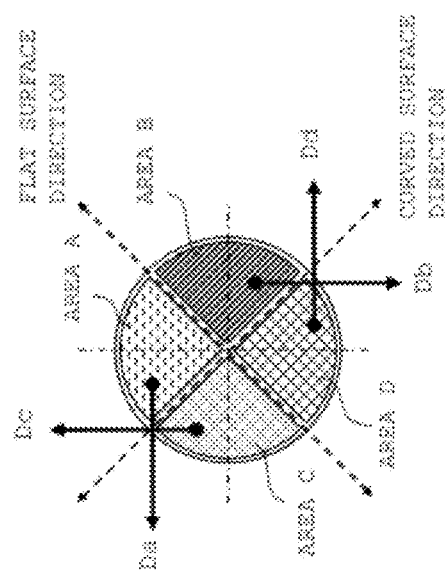

FIGS. 4A and 4B are diagrams showing a distribution state of signal light and stray light 1, 2 on the plane S0, in the case where the propagating directions of light fluxes (signal light, stray light 1, 2) passing through the four areas A through D shown in FIG. 2A are respectively changed in different directions by the same angle. FIG. 4A is a diagram of the anamorphic lens when viewed from the optical axis direction of the anamorphic lens (the propagating direction along which laser light is entered into the anamorphic lens), and FIG. 4B is a diagram showing a distribution state of signal light, stray light 1, 2 on the plane S0.

In FIG. 4A, the propagating directions of light fluxes (signal light, stray light 1, 2) that have passed through the areas A through D are respectively changed into directions Da, Db, Dc, Dd by the same angle amount α (not shown) with respect to the propagating directions of the respective light fluxes before incidence. The directions Da, Db, Dc, Dd each has an inclination of 45° with respect to the flat surface direction and the curved surface direction.

In this case, as shown in FIG. 4B, it is possible to distribute signal light and stray light 1, 2 in each of the light flux areas, on the plane S0, by adjusting the angle amount α with respect to the directions Da, Db, Dc, Dd. As a result of the above operation, as shown in FIG. 4B, it is possible to form a signal light area where only signal light exists on the plane S0. By disposing sensors of a photodetector in the signal light area, it is possible to receive only signal light in each of the light flux areas by a corresponding sensor.

Figure 5A:
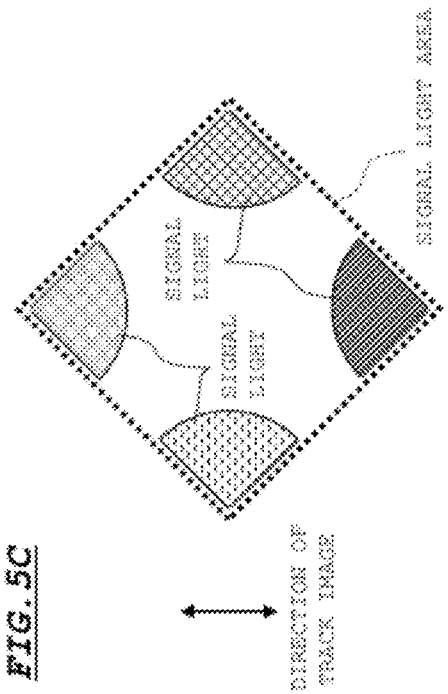
FIGS. 5A through 5D are diagrams for describing a method for arranging sensors in the embodiment.
Figure 5C:
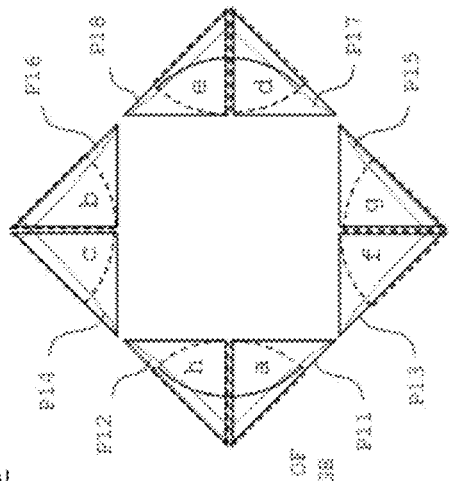
Figure 5B:
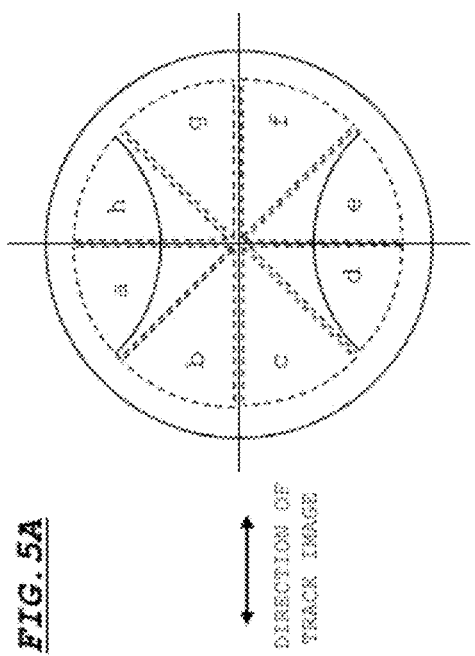
Figure 5D:
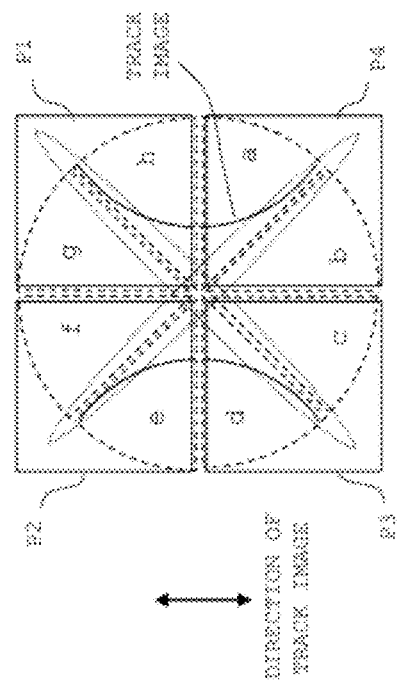

FIGS. 5A through 5D are diagrams showing a method for arranging sensors. FIG. 5A is a diagram showing light flux areas of reflected light (signal light) on a disc, and FIG. 5B is a diagram showing a distribution state of signal light on a photodetector, in the case where an anamorphic lens and a photodetector (a four-divided sensor) based on a conventional astigmatism method are respectively disposed on the arranged position of the anamorphic lens and on the plane S0, in the arrangement shown in FIG. 1A. FIGS. 5C and 5D are diagrams showing a distribution state of signal light and a sensor layout based on the above principle, on the plane S0.

The direction of a diffraction image (a track image) of signal light resulting from a track groove has an inclination of 45° with respect to the flat surface direction and the curved surface direction. In FIG. 5A, assuming that the direction of a track image is aligned with leftward and rightward directions, in FIGS. 5B through 5D, the direction of a track image by signal light is aligned in upward and downward directions. In FIGS. 5A and 5B, to simplify the description, a light flux is divided into eight light flux areas a through h. Further, the track image is shown by the solid line, and the beam shape in an out-of-focus state is shown by the dotted line.

It is known that an overlapped state of a zero-th order diffraction image and a first-order diffraction image of signal light resulting from a track groove is obtained by an equation: wavelength/(track pitch×objective lens NA). As shown in FIGS. 5A, 5B, 5D, a requirement that a first-order diffraction image is formed in the four light flux areas a, b, e, h is expressed by: wavelength track pitch×objective lens NA>√2.

In the conventional astigmatism method, sensors P1 through P4 (a four-divided sensor) of a photodetector are arranged as shown in FIG. 5B. In this case, assuming that detection signal components based on light intensities in the light flux areas a through h are expressed by A through H, a focus error signal FE and a push-pull signal PP are obtained by the following equations (1) and (2).

$$FE = (A+B+E+F) - (C+D+G+H) \quad (1)$$

$$PP = (A+B+G+H) - (C+D+E+F) \quad (2)$$

On the other hand, as described above, signal light is distributed in the signal light area as shown in FIG. 5C in the distribution state shown in FIG. 4B. In this case, signal light passing through the light flux areas a through h shown in FIG. 5A is distributed as shown in FIG. 5D. Specifically, signal light passing through the light flux areas a through h in FIG. 5A are guided to the light flux areas a through h shown in FIG. 5D, on the plane S0 where the sensors of the photodetector are disposed.

Accordingly, by disposing the sensors P11 through P18 at the positions of the light flux areas a through h shown in FIG. 5D in an overlapped state as shown in FIG. 5D, it is possible to generate a focus error signal and a push-pull signal by performing the same computation as applied to the process described in the case of FIG. 5B. Specifically, assuming that A through H represent detection signals from the sensors for receiving light fluxes in the light flux areas a through h, a focus error signal FE and a push-pull signal PP can be acquired by the above equations (1) and (2) in the same manner as described in the case of FIG. 5B.

As described above, according to the above principle, it is possible to generate a focus error signal and a push-pull signal (a tracking error signal) with no or less influence of stray light by performing the same computation as applied to the process based on the conventional astigmatism method.

Figure 6:
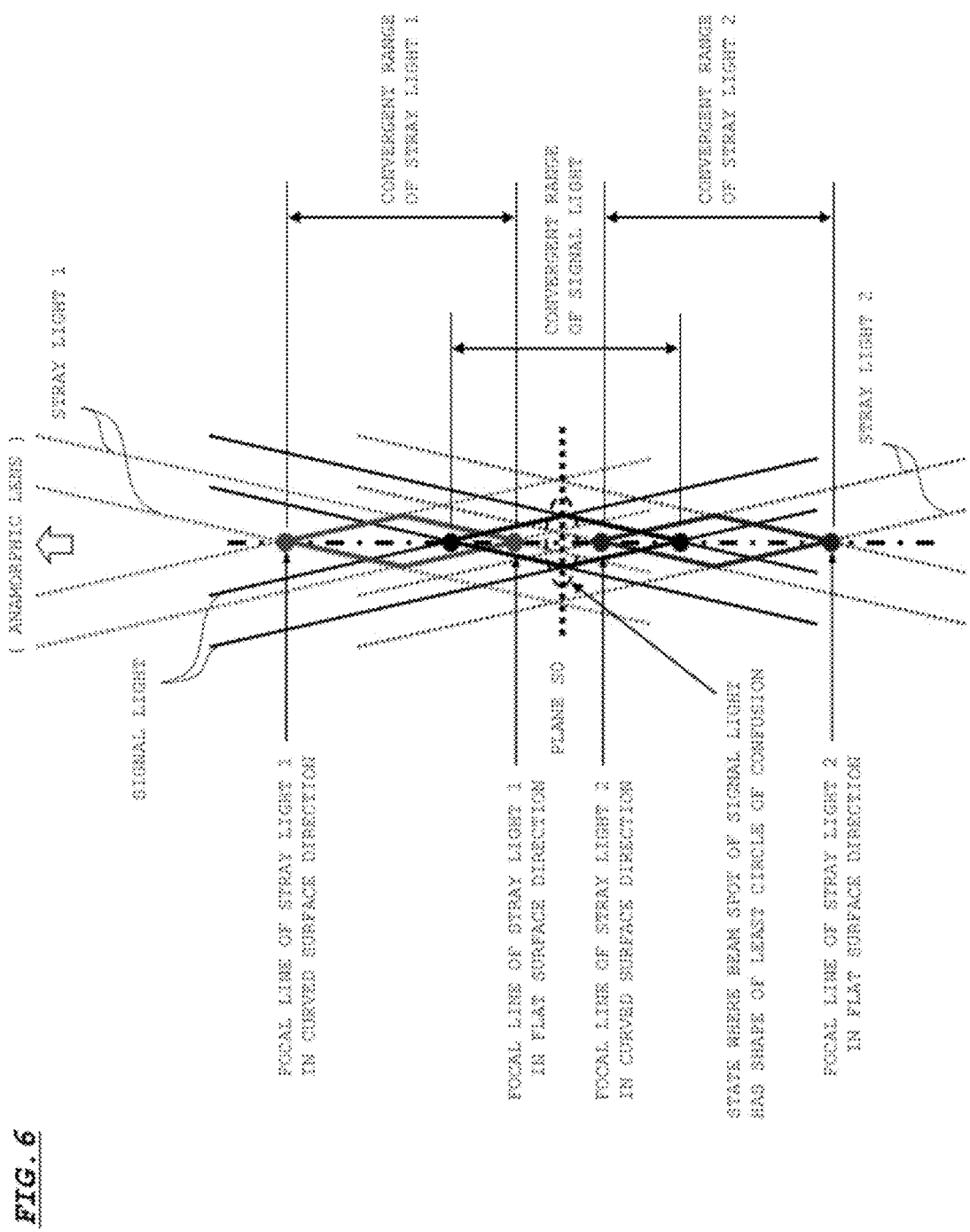
FIG. 6 is a diagram showing a preferable range to which the technical principle of the embodiment is applied.

The effect by the above principle is obtained, as shown in FIG. 6, in the case where the focal line position of stray light 1 in the flat surface direction is close to the anamorphic lens with respect to the plane S0 (a plane where the beam spot of signal light has a shape of a least circle of confusion), and the focal line position of stray light 2 in the curved surface direction is away from the anamorphic lens with respect to the plane S0. Specifically, as far as the above relationship is satisfied, the distribution state of signal light, and stray light 1, 2 is as shown in FIG. 4B, which makes it possible to keep signal light, and stray light 1, 2 from overlapping each other on the plane S0. In other words, as far as the above relationship is satisfied, the advantage based on the above principle is obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

A spectral element H can be used to distribute signal light passing through the eight light flux areas a through h shown in FIG. 5A, on the sensor layout shown in FIG. 5D.

FIG. 7A is a diagram showing an arrangement of the spectral element H. FIG. 7A is a plan view of the spectral element H when viewed from the side of the anamorphic lens shown in FIG. 1B. FIG. 7A also shows the flat surface direction, the curved surface direction of the anamorphic lens shown in FIG. 1B, and a direction of a track image of laser light to be entered into the spectral element H.

The spectral element H is made of a square transparent plate, and has a stepped diffraction pattern (a diffraction hologram) on a light incident surface thereof. As shown in FIG. 7A, the light incident surface of the spectral element H is divided into four diffraction areas Ha through Hd. The spectral element H is disposed at such a position that laser light passing through the light flux areas A through D shown in FIG. 4A are respectively entered into the diffraction areas Ha through Hd. The diffraction areas Ha through Hd respectively diffract the entered laser light in the directions Da through Dd shown in FIG. 4A by the same angle by diffraction on the diffraction areas Ha through Hd.

FIGS. 7B through 7D are schematic diagrams showing irradiation areas, in the case where laser light passing through the eight light flux areas a through h shown in FIG. 5A is irradiated onto the sensor layout shown in FIG. 5D. FIG. 7B is a diagram showing a state as to how signal light is irradiated onto the sensors P11 through P18, in the case where the focus position of laser light is adjusted on a target recording layer. FIGS. 7C, 7D are diagrams showing states of stray light 1 and stray light 2 in the above condition. To simplify the description, the irradiation areas of laser light passing through the light flux areas a through h are indicated as irradiation areas a through h in each of the drawings of FIGS. 7B through 7D.

As shown in FIG. 7B, signal light is irradiated onto the sensors P11 through P18 based on the above principle. The sensors P11 through P18 are configured such that the irradiation area of signal light is sufficiently included in each of the sensors P11 through P18. Specifically, as shown in FIG. 7B, the sensor layout is configured in such a manner that four vertices of the signal light area are positioned on the inside of four vertices on the outside of the sensor layout.

As shown in FIG. 7C, stray light 1 is irradiated onto a position adjacent to the outside of the signal light area according to the above principle. As described above, however, if the sensor layout is configured in such a manner that the signal light area is positioned on the inside of the sensor layout, the irradiation area of stray light 1 is likely to overlap the sensors P11 through P18. Similarly to the above, as shown in FIG. 7D, the irradiation area of stray light 2 is also likely to overlap the sensors P11 through P18.

As described above, in the case where signal light passing through the light flux areas a through h is distributed on the sensor layout using the spectral element H, stray light 1, 2 is likely to be entered into the sensors P11 through P18, which may degrade the precision of output signals from the sensors P11 through P18.

Next, described is an arrangement to how a recording layer is determined using the spectral element H.

Figure 8A:
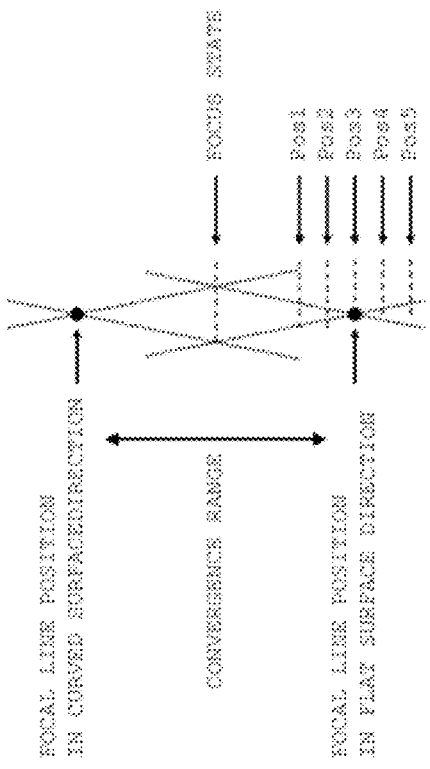
FIGS. 8A and 8B are schematic diagrams showing how an irradiation area is shifted in the case where the spectral element based on the technical principle of the embodiment is used.
Figure 8B:
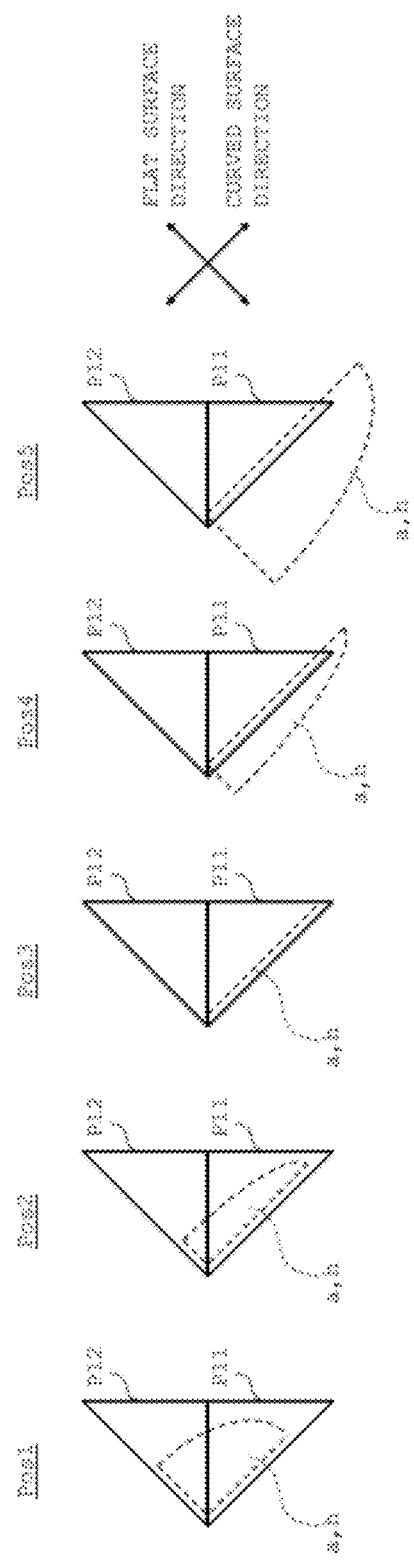

FIG. 8A is a diagram showing a state as to how reflected light from a certain recording layer in a disc is converged. FIG. 8B is a schematic diagram showing the irradiation areas a, h, in the case where a light receiving surface (sensors P11 through P18) of a photodetector is positioned at the positions Pos1 through Pos5, with respect to the convergence range shown in FIG. 8A.

As shown in FIG. 8B, in the case where the light receiving surface lies within the convergence range (Pos1, Pos2), the irradiation areas a, h are positioned within the area of the sensors P11 and P12. In the case where the light receiving surface is out of the convergence range (Pos4, Pos5), as shown in FIG. 7C, the irradiation areas a, h are positioned on the outside of the sensors P11 and P12. In the case where the light receiving surface is near the focal line position in the flat surface direction (Pos2, Pos4), the irradiation areas a, h have a configuration with a long size in the curved surface direction and a short size in the flat surface direction. In the case where the light receiving surface is at the focal line position in the flat surface direction (Pos3), the irradiation areas a, h have a linear shape extending in the curved surface direction.

In the above arrangement, the sum of output signals from the sensors P11 and P12 in the case where the light receiving surface is out of the convergence range is smaller than the sum of output signals from the sensors P11 and P12 in the case where the light receiving surface lies within the convergence range. However, as shown by Pos4, Pos5 in FIG. 8B, since the irradiation areas a, h positioned on the outside of the sensors P11 and P12 are near the sensors P11 and P12, a part of the irradiation areas a, h is overlapped with the sensors P11 and P12. As a result, even if the light receiving surface is shifted away from the convergence range, a part of the irradiation areas a, h continues to be overlapped with the sensors P11 and P12, which makes it difficult to make the sum of output signals from the sensors P11 and P12 closer to zero.

Similarly to the above, in the case where the light receiving surface is shifted away from the convergence range, it is also difficult to make the sum of output signals from the sensors P13 and P15, the sensors P14 and P16, the sensors P17 and 18 closer to zero. Accordingly, in the case where the light receiving surface is shifted away from the convergence range, it is difficult to make the sum (a SUM signal) of output signals from the sensors P11 through P18 closer to zero.

FIG. 9A is a schematic diagram showing a SUM signal, in the case where the position of the light receiving surface (sensors P11 through P18) of the photodetector is shifted from the convergence range of reflected light on a certain recording layer in a disc.

Referring to FIG. 9A, in the case where the light receiving surface lies within the convergence range, the irradiation areas a through h are positioned on the sensors P11 through P18, and the SUM signal is substantially kept constant. In the case where the light receiving surface is out of the convergence range, since the irradiation areas a through h are positioned on the outside of the sensors P11 through P18, the SUM signal to be obtained when the light receiving surface is out of the convergence range is smaller than the SUM signal to be obtained when the light receiving surface lies within the convergence range. As described above, in the case where the light receiving surface is shifted away from the convergence range, it is difficult to make the SUM signal closer to zero. As a result, as shown in FIG. 9A, the SUM signal to be obtained when the light receiving surface is out of the convergence range has a moderate slope.

FIG. 9B is a schematic diagram showing a state that the convergence ranges of plural recording layers are adjacent to each other, and that the SUM signal shown in FIG. 9A is overlapped.

In the case where a disc has plural recording layers, a target recording layer is determined by a fall of a SUM signal between the adjacent convergence ranges shown in FIG. 9B. In this arrangement, as shown in FIG. 9A, since the SUM signal to be obtained when the light receiving surface is out of the convergence range has a moderate slope, a fall of an overlapped SUM signal as shown in FIG. 9B is also small. As a result, it may be difficult to determine a target recording layer.

Next, an S-shaped curve in the case where the spectral element H is used is described. The S-shaped curve represents a configuration of a focus error signal FE expressed by the equation (1), in the case where the focus position of laser light is shifted forward and rearward of a recording layer. A detection range of an S-shaped curve corresponds to a width by which the focus position of laser light is shifted between the case where the S-shaped curve has a maximum value and the case where the S-shaped curve has a minimum value.

Referring back to FIG. 8B, in the case where the light receiving surface of the photodetector is shifted from Pos1 to Pos3, the output signal from the sensor P11 as a plus component of a focus error signal FE is increased, and the output signal from the sensor P12 as a minus component of the focus error signal FE is decreased. Further, in the case where the light receiving surface of the photodetector is shifted from Pos3 to Pos4, the irradiation area is positioned on the outside of the sensors P11 and P12, and the irradiation area continues to expand. As a result, the output signal from the sensor P11 as a plus component of a focus error signal FE is decreased. Thus, the above result shows that a value obtained by subtracting an output signal of the sensor P12 from an output signal of the sensor P11 becomes maximal, in the case where the light receiving surface is near Pos3.

Similarly to the above, in the case where the light receiving surface is near the focal line position in the curved surface direction, a value obtained by subtracting an output signal of the sensor P12 from an output signal of the sensor P11 becomes minimal. The same description as described above is also applied to output signals from the sensors P13 and P15, the sensors P16 and P14, the sensors P18 and P17. Thus, a peak of an S-shaped curve is formed on the plus side of a focus error signal FE in the case where the light receiving surface is near the focal line position in the flat surface direction, and a peak of the S-shaped curve is formed on the minus side of the focus error signal FE in the case where the light receiving surface is at the focal line position in the curved surface direction.

Further, in the case where the light receiving surface is shifted away from the convergence range, a part of the irradiation areas a, h continues to overlap the sensors. As a result, it is difficult to make output signals from the sensors P11, P13, P16, P18, as a plus component of a focus error signal FE, closer to zero, as well as the SUM signal. Thus, it is difficult to make the focus error signal FE closer to zero in a range outside of the detection range of an S-shaped curve.

FIG. 9C is a diagram showing an S-shaped curve, in the case where the focus position of laser light is shifted forward and rearward of a recording layer.

As described above, in the case where the light receiving surface of the photodetector is positioned at the focal line position in the flat surface direction and in the curved surface direction, a peak of an S-shaped curve is formed. Further, as described above, in the case where the light receiving surface is shifted away from the convergence range, it is difficult to make the focus error signal FE closer to zero in a range outside of the detection range. As a result, as shown in FIG. 9C, the focus error signal FE has a moderate slope in a range outside of the detection range.

In the case where plural recording layers are formed in proximity to each other, left and right portions of the S-shaped curve shown in FIG. 9C are overlapped with S-shaped curves of recording layers adjacent to a target recording layer. As a result, in performing focus servo control with respect to the target recording layer, the target S-shaped curve for focus control may be distorted resulting from an influence of the left-side or right-side S-shaped curve. It is necessary to narrow the detection range shown in FIG. 9C, and to make the slope of the focus error signal FE sharp in a range outside of the detection range in order to reduce the influence of the left-side or right-side S-shaped curve which may overlap the target S-shaped curve for focus control.

As described above, in the case where the spectral element H shown in FIG. 7A is used, a SUM signal and a focus error signal FE (an S-shaped curve) may be degraded. In the following description on an example, there is described an improvement on the spectral element H that enables to suppress the aforementioned drawbacks, as well as a concrete construction example of the optical pickup device.

Example

The inventive example is an example, wherein the invention is applied to an optical pickup device compatible with BD, DVD and CD. The above principle is applied only to an optical system for BD, and a focus adjusting technology by a conventional astigmatism method and a tracking adjusting technology by a 3-beam system (an in-line system) are applied to an optical system for CD and an optical system for DVD.

FIGS. 10A and 10B are diagrams showing an optical system of an optical pickup device in the inventive example. FIG. 10A is a plan view of the optical system showing a state that elements of the optical system on the disc side with respect to rise-up mirrors 114, 115 are omitted, and FIG. 10B is a perspective side view of the optical system posterior to the rise-up mirrors 114, 115.

As shown in FIG. 10A, the optical pickup device is provided with a semiconductor laser 101, a half wave plate 102, a diverging lens 103, a dual wavelength laser 104, a diffraction grating 105, a diverging lens 106, a complex prism 107, a front monitor 108, a collimator lens 109, a driving mechanism 110, reflection mirrors 111, 112, a quarter wave plate 113, the rise-up mirrors 114, 115, a dual wavelength objective lens 116, a BD objective lens 117, a spectral element 118, an anamorphic lens 119, and a photodetector 120.

The semiconductor laser 101 emits laser light (hereinafter, called as "BD light") for BD and having a wavelength of or about 405 nm. The half wave plate 102 adjusts the polarization direction of BD light. The diverging lens 103 adjusts the focal length of BD light to shorten the distance between the semiconductor laser 101 and the complex prism 107.

The dual wavelength laser 104 accommodates, in a certain CAN, two laser elements which each emit laser light (hereinafter, called as "CD light") for CD and having a wavelength of or about 785 nm, and laser light (hereinafter, called as "DVD light") for DVD and having a wavelength of or about 660 nm.

FIG. 10C is a diagram showing an arrangement pattern of laser elements (laser light sources) in the dual wavelength laser 104. FIG. 10C is a diagram of the dual wavelength laser 104 when viewed from the beam emission side. In FIG. 10C, CE and DE respectively indicate emission points of CD light and DVD light. The gap between the emission points of CD light and DVD light is represented by the symbol G.

As will be described later, the gap G between the emission point CE of CD light and the emission point DE of DVD light is set to such a value as to properly irradiate DVD light onto a four-divided sensor for DVD light. Accommodating two light sources in one CAN as described above enables to simplify the optical system, as compared with an arrangement provided with plural CANs.

Referring back to FIG. 10A, the diffraction grating 105 separates each of CD light and DVD light into a main beam and two sub beams. The diffraction grating 105 is a two-step diffraction grating. Further, the diffraction grating 105 is integrally formed with a half wave plate. The half wave plate integrally formed with the diffraction grating 105 adjusts the polarization directions of CD light and DVD light. The diverging lens 106 adjusts the focal lengths of CD light and DVD light to shorten the distance between the dual wavelength laser 104 and the complex prism 107.

The complex prism 107 is internally formed with a dichroic surface 107a, and a Polarizing Beam Splitter (PBS) surface 107b. The dichroic surface 107a reflects BD light, and transmits CD light and DVD light. The semiconductor laser 101, the dual wavelength laser 104 and the complex prism 107 are disposed at such positions that the optical axis of BD light reflected on the dichroic surface 107a and the optical axis of CD light transmitted through the dichroic surface 107a are aligned with each other. The optical axis of DVD light transmitted through the dichroic surface 107a is displaced from the optical axes of BD light and CD light by the gap G shown in FIG. 10C.

A part of each of BD light, CD light and DVD light is reflected on the PBS surface 107b, and a main part thereof is transmitted through the PBS surface 107b. As described above, the half wave plate 102, and the diffraction grating 105 (and the half wave plate integrally formed with the diffraction grating 105) are disposed at such positions that a part of each of BD light, CD light and DVD light is reflected on the PBS surface 107b.

When the diffraction grating 105 is disposed at the position as described above, a main beam and two sub beams of CD light, and a main beam and two sub beams of DVD light are respectively aligned along the tracks of CD and DVD. The main beam and the two sub beams reflected on CD are irradiated onto four-divided sensors for CD on the photodetector 120, which will be described later. The main beam and two sub beams reflected on DVD are irradiated onto four-divided sensors for DVD on the photodetector 120, which will be described later.

BD light, CD light, DVD light reflected on the PBS surface 107*b* is irradiated onto the front monitor 108. The front monitor 108 outputs a signal in accordance with a received light amount. The signal from the front monitor 108 is used for emission power control of the semiconductor laser 101 and the dual wavelength laser 104.

The collimator lens 109 converts BD light, CD light and DVD light entered from the side of the complex prism 107 into parallel light. The driving mechanism 110 moves the collimator lens 109 in the optical axis direction in accordance with a control signal for aberration correction. The driving mechanism 110 is provided with a holder 110*a* for holding the collimator lens 109, and a gear 110*b* for feeding the holder 110*a* in the optical axis direction of the collimator lens 109. The gear 110*b* is interconnected to a driving shaft of a motor 110*c*.

BD light, CD light and DVD light collimated by the collimator lens 109 are reflected on the two reflection mirrors 111, 112, and are entered into the quarter wave plate 113. The quarter wave plate 113 converts BD light, CD light and DVD light entered from the side of the reflection mirror 112 into circularly polarized light, and converts BD light, CD light and DVD light entered from the side of the rise-up mirror 114 into a linearly polarized light whose polarization direction is orthogonal to the polarization direction upon incidence from the side of the reflection mirror 112. With this operation, light reflected on a disc is reflected on the PBS surface 107*b*.

The rise-up mirror 114 is a dichroic mirror. The rise-up mirror 114 transmits BD light, and reflects CD light and DVD light in a direction toward the dual wavelength objective lens 116. The rise-up mirror 115 reflects BD light in a direction toward the BD objective lens 117.

The dual wavelength objective lens 116 is configured to properly focus CD light and DVD light on CD and DVD, respectively. Further, the BD objective lens 117 is configured to properly focus BD light on BD. The dual wavelength objective lens 116 and the BD objective lens 117 are driven by an objective lens actuator 132 in a focus direction and in a tracking direction, while being held on the holder 110*a*.

The spectral element 118 has a stepped diffraction pattern (a diffraction hologram) on an incident surface thereof. Out of BD light, CD light and DVD light entered into the spectral element 118, BD light is divided into twelve light fluxes, which will be described later, and the propagating direction of each of the light fluxes is changed by diffraction on the spectral element 118. Main parts of CD light and DVD light are transmitted through the spectral element 118 without diffraction on the spectral element 118. An arrangement of the spectral element 118 will be described later referring to FIG. 11A.

The anamorphic lens 119 imparts astigmatism to BD light, CD light and DVD light entered from the side of the spectral element 118. The anamorphic lens 119 corresponds to the anamorphic lens shown in FIG. 1B. BD light, CD light and DVD light transmitted through the anamorphic lens 119 are entered into the photodetector 120. The photodetector 120 has a sensor layout for receiving the respective light. The sensor layout of the photodetector 120 will be described later referring to FIG. 12.

Figure 11B:
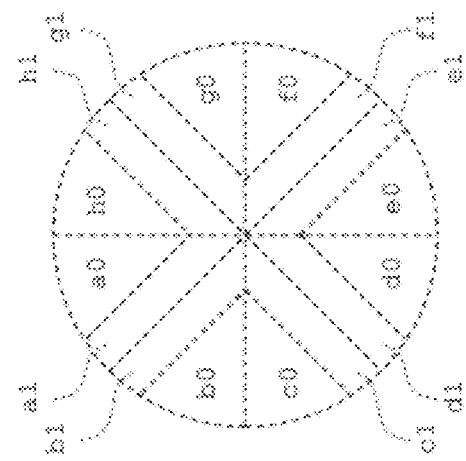
FIGS. 11A and 11B are diagrams showing an arrangement of a spectral element in the inventive example.
Figure 11A:
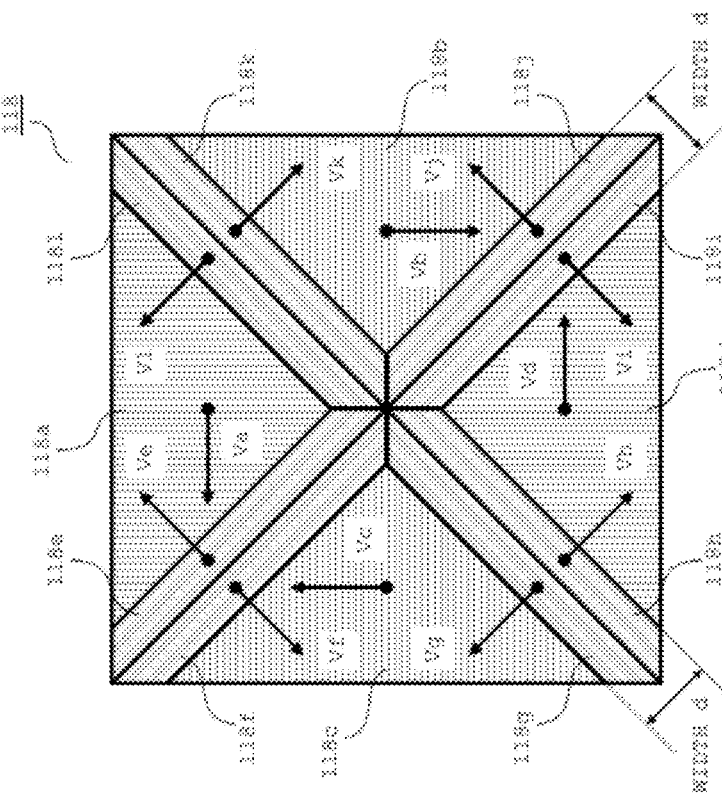

FIG. 11A is a diagram showing an arrangement of the spectral element 118. FIG. 11A is a plan view of the spectral element 118, when viewed from the side of the complex prism 107. FIG. 11A also shows the flat surface direction, the curved surface direction of the anamorphic lens 119, and a direction of a track image of laser light to be entered into the spectral element 118.

The spectral element 118 is made of a square transparent plate, and has a stepped diffraction pattern (a diffraction hologram) on a light incident surface thereof. The diffraction pattern is a stepped diffraction pattern. The step number and the step height of the diffraction pattern are set such that plus first order diffraction efficiency with respect to the wavelength of BD light is set high, and that zero-th order diffraction efficiency with respect to the wavelengths of CD light and DVD light is set high.

As shown in FIG. 11A, the light incident surface of the spectral element 118 is divided into twelve diffraction areas 118*a* through 118*l*. The spectral element 118 is disposed at such a position that BD light is uniformly entered into the diffraction areas 118*a* through 118*l*. Specifically, the spectral element 118 is disposed at such a position that the center of the spectral element 118 shown in FIG. 11A is aligned with the optical axis of BD light.

As shown in FIG. 11A, the diffraction areas 118*e* and 118*f*, and the diffraction areas 118*i* and 118*j* each extends in the curved surface direction, and has a width d. As shown in FIG. 11A, the diffraction areas 118*g* and 118*h*, and the diffraction areas 118*k* and 118*l* each extends in the flat surface direction, and has a width d.

FIG. 11B is a diagram showing light flux areas a0 through h0, a1 through h1 of BD light which is entered into the diffraction areas 118*a* through 118*l* of the spectral element 118. Light passing through light flux areas a0, h0, light flux areas f0, g0, light flux areas b0, c0, light flux areas d0, e0 is respectively entered into the diffraction areas 118*a* through 118*d*. Further, light passing through light flux areas a1, b1, c1, d1, e1, f1, g1, h1 is respectively entered into the diffraction areas 118*e* through 118*l*.

Referring back to FIG. 11A, the diffraction areas 118*a* through 118*d* diffract entered BD light in directions Va through Vd by plus first order diffraction. The directions Va through Vd respectively coincide with the directions Da through Dd shown in FIG. 4A. Further, each of the diffraction areas 118*a* through 118*d* diffracts BD light by the same diffraction angle by plus first order diffraction. The diffraction angle is adjusted by the pitch of a diffraction pattern.

The diffraction areas 118*e* through 118*l* diffract entered BD light in directions Ve through Vl by plus first order diffraction. The directions Ve through Vl are inclined by 45° with respect to the directions Va through Vd. The pitch of the diffraction pattern of the diffraction areas 118*e* through 118*l* is set smaller than the pitch of the diffraction pattern of the diffraction areas 118*a* through 118*d*. With this arrangement, the diffraction angle of BD light diffracted on the diffraction areas 118*e* through 118*l* is set larger than the diffraction angle of BD light diffracted on the diffraction areas 118*a* through 118*d*.

With use of the spectral element 118 having the above configuration, BD light diffracted on the diffraction areas 118*a* through 118*d* is irradiated onto the light receiving surface of the photodetector 120, as shown in FIG. 4B. Further, as will be described later, BD light diffracted on the diffraction areas 118*e* through 118*l* is irradiated onto a position on the outside of a rectangle defined by vertices on the outside of the sensor layout, on the light receiving surface of the photodetector 120. CD light and DVD light are irradiated onto four-divided sensors on the photodetector 120, which will be described later, substantially without diffraction on the diffraction areas 118*a* through 118*l*.

The diffraction areas 118a through 118l are formed by e.g. a diffraction pattern having eight steps. In this case, the step difference per step is set to 7.35 μm. With this arrangement, it is possible to set the diffraction efficiencies of zero-th order diffraction light of CD light and DVD light to 99% and 92% respectively, while keeping the diffraction efficiency of plus first order diffraction light of BD light to 81%. In this case, zero-th order diffraction efficiency of BD light is set to 7%.

Alternatively, it is possible to set the number of steps of a diffraction pattern to be formed in the diffraction areas 118a through 118l to the number other than eight. Furthermore, it is possible to configure the diffraction areas 118a through 118l by using e.g. the technology disclosed in Japanese Unexamined Patent Publication No. 2006-73042. Using the above technology enables to more finely adjust diffraction efficiencies of BD light, CD light and DVD light.

Figure 12:
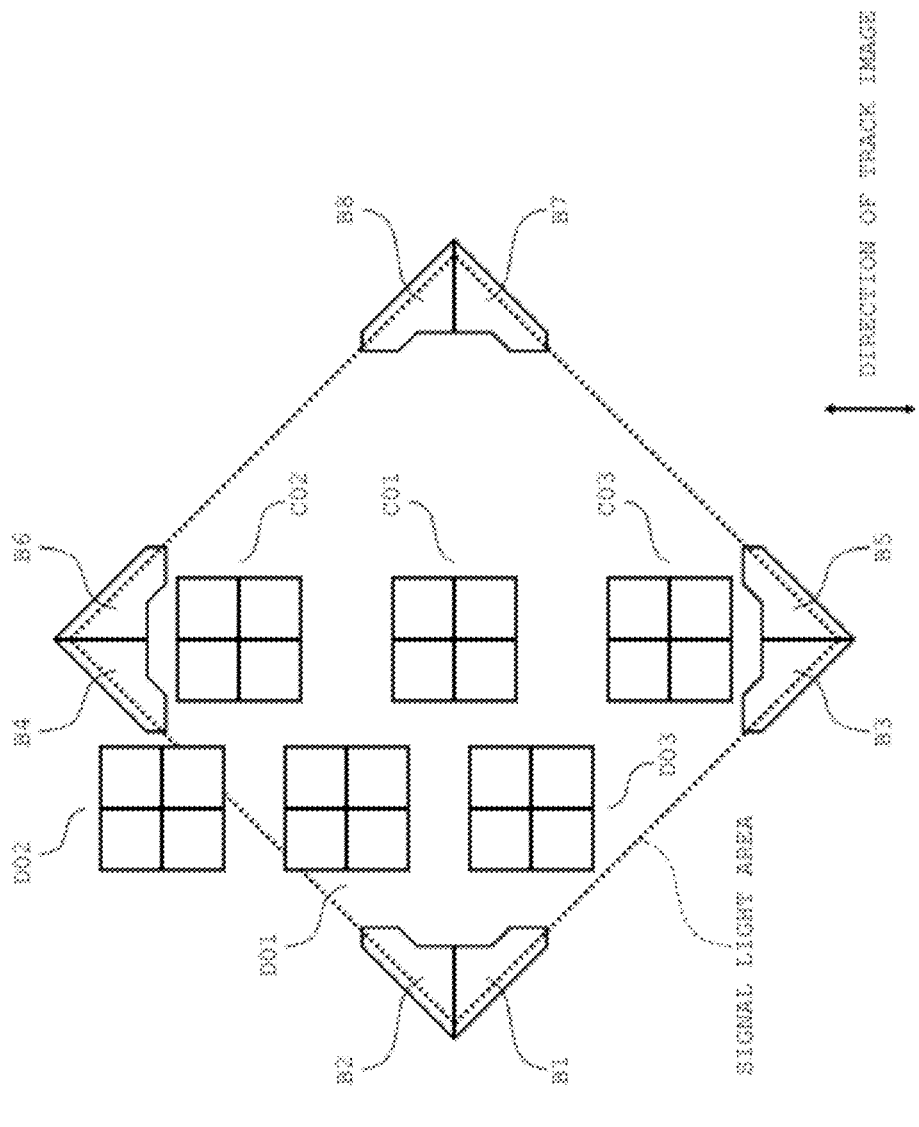
FIG. 12 is a diagram showing a sensor layout of a photodetector in the inventive example.

FIG. 12 is a diagram showing a sensor layout of the photodetector 120.

The photodetector 120 has sensors B1 through B8 for BD and for receiving BD light separated by the spectral element 118; four-divided sensors C01 through C03 for CD and for receiving CD light transmitted through the spectral element 118 without separation by the spectral element 118; and four-divided sensors D01 through D03 for DVD and for receiving DVD light transmitted through the spectral element 118 without separation by the spectral element 118.

Signal light of BD light separated by the spectral element 118 is irradiated onto four vertex portions of a square, in the same manner as the irradiation area of signal light shown in FIG. 4B. The signal light area shown in FIG. 12 indicates the irradiation area of signal light separated by the spectral element H, in place of the spectral element 118. Specifically, the signal light area in the above case has a rectangular shape formed by connecting vertices on the outside of the irradiation area of signal light separated by the spectral element H. As will be described later, the irradiation area of signal light separated by the spectral element 118 is positioned on the inside of the signal light area formed by the spectral element H, because the irradiation area formed by the spectral element 118 has a shape with the vertex portions thereof being removed.

As shown in FIG. 12, the sensors B1, B2, the sensors B3, B5, the sensors B4, B6, the sensors B7, B8 are respectively disposed near the four vertices of the signal light area to receive signal light of BD light passing through the light flux areas a0 through h0, respectively. The sensors B1 through B8 are disposed at such positions that the irradiation area of BD light which is positioned on the inside of the four vertex portions of the signal light area is sufficiently included. With this arrangement, it is possible to sufficiently receive signal light separated by the spectral element 118 by the sensors B1 through B8, even in the case where the positions of the sensors B1 through B8 are displaced resulting from e.g. aging deterioration.

The optical axes of BD light and CD light are aligned with each other on the dichroic surface 107a as described above. Accordingly, a main beam (zero-th order diffraction light) of CD light is irradiated onto a center of the signal light area of BD light, on the light receiving surface of the photodetector 120. The four-divided sensor C01 is disposed at the center position of a main beam of CD light. The four-divided sensors C02, C03 are disposed in the direction of a track image with respect to a main beam of CD light, on the light receiving surface of the photodetector 120, to receive sub beams of CD light.

Since the optical axis of DVD light is displaced from the optical axis of CD light as described above, a main beam and two sub beams of DVD light are irradiated at positions displaced from the irradiation positions of a main beam and two sub beams of CD light, on the light receiving surface of the photodetector 120. The four-divided sensors D01 through D03 are respectively disposed at the irradiation positions of a main beam and two sub beams of DVD light. The distance between a main beam of CD light and a main beam of DVD light is determined by the gap G between emission points of CD light and DVD light shown in FIG. 10C.

FIGS. 13A through 13C are schematic diagrams showing irradiation areas of BD light, in the case where BD light passing through the sixteen light flux areas a0 through h0, a1 through h1 shown in FIG. 11B is irradiated onto the sensors B1 through B8 shown in FIG. 12. FIGS. 13A through 13C are diagrams respectively showing signal light, stray light 1 and stray light 2 of BD light that is irradiated onto the sensors B1 through B8, in the case where the focus position of BD light is adjusted on a target recording layer. To simplify the description, the irradiation areas of BD light passing through the light flux areas a0 through h0, a1 through h1 are indicated as irradiation areas a0 through h0, a1 through h1 in each of the drawings of FIGS. 13A through 13C. Further, to simplify the description, the shape of the sensors B1 through B8 shown in FIGS. 13A through 13C is simplified in comparison with the shape of the sensors B1 through B8 shown in FIG. 12.

As shown in FIG. 13A, signal light of BD light passing through the light flux areas a0 through h0 is irradiated onto the sensors B1 through B8, and signal light of BD light passing through the light flux areas a1 through h1 is irradiated onto a position away from the signal light area. Out of signal light of BD light to be entered into the spectral element 118, signal light of BD light to be entered into the diffraction areas 118e through 118l is diffracted with a large diffraction angle on the outside of the signal light area. As a result of the above operation, out of signal light of BD light to be entered into the spectral element 118, only signal light of BD light to be entered into the diffraction areas 118a through 118d is irradiated onto the sensors B1 through B8. In this arrangement, the irradiation area on the sensors B1 through B8 is positioned on the inside of the signal light area depending on the width d (see FIG. 11A) of the diffraction areas 118e through 118l.

As shown in FIGS. 13B, 13C, stray light 1, 2 of BD light passing through the light flux areas a0 through h0, a1 through h1 are irradiated on the outside of the signal light area. In this case, as compared with the case where the spectral element H is used (see FIGS. 7C, 7D), stray light 1, 2 of BD light passing through the light flux areas a0 through h0 are irradiated at a position away from the signal light area in the outside direction. With this arrangement, there is no or less likelihood that stray light 1, 2 may be entered into the sensors B1 through B8.

Next, described is an arrangement as to how a recording layer is determined in the inventive example.

Figure 14A:
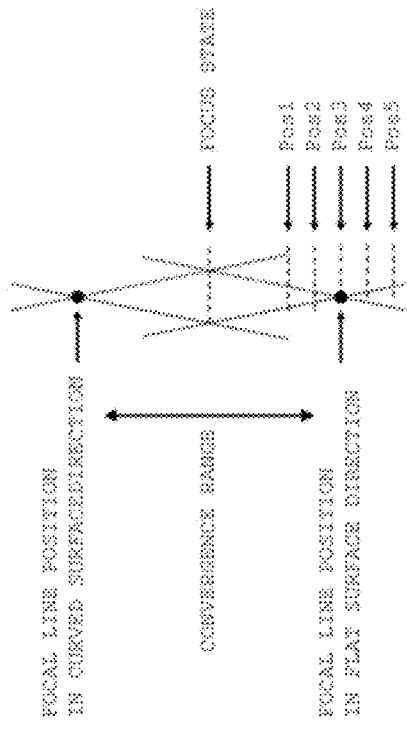
FIGS. 14A and 14B are schematic diagrams showing how an irradiation area is shifted in the inventive example.
Figure 14B:
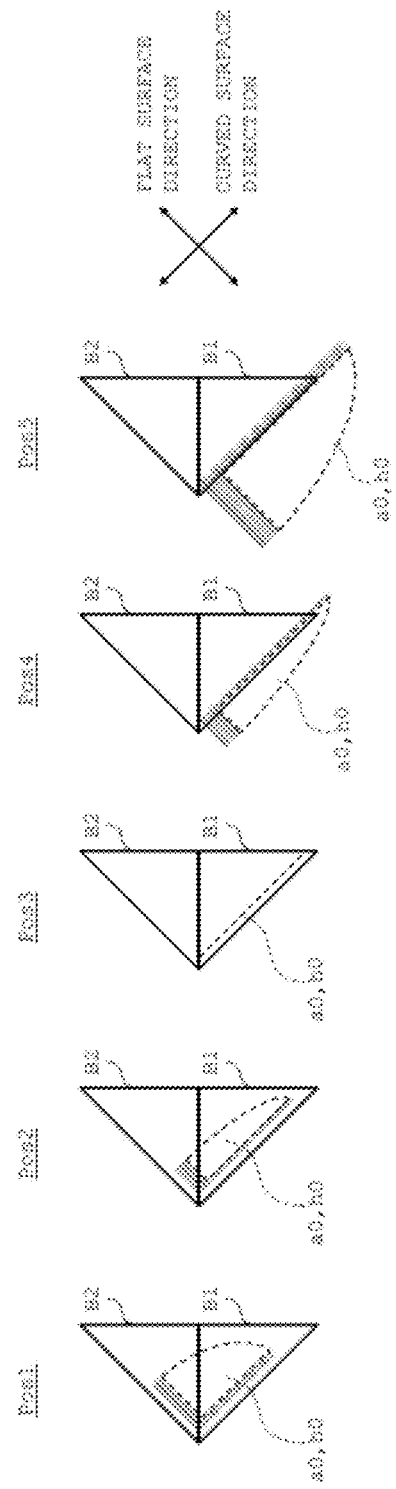
Figure 17A:
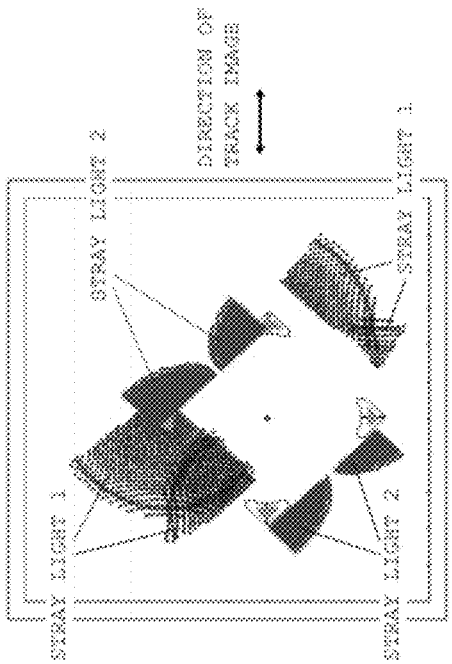
FIGS. 17A through 17D are diagrams showing a simulation result, in the case where the spectral element based on the technical principle of the embodiment is used, and in the case where the spectral element in the inventive example is used.
Figure 17B:
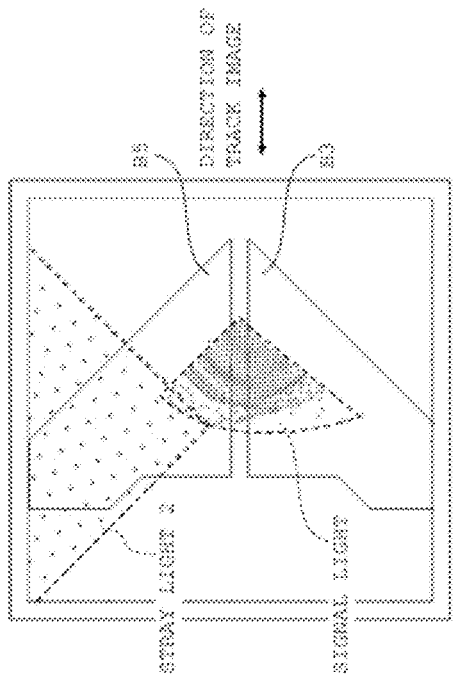
Figure 17C:
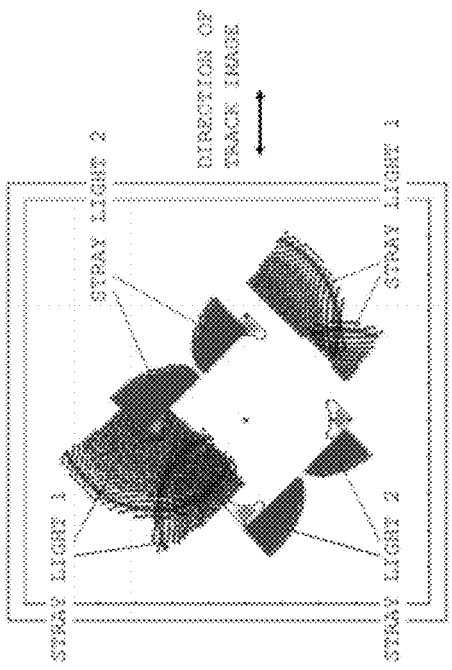
Figure 17D:
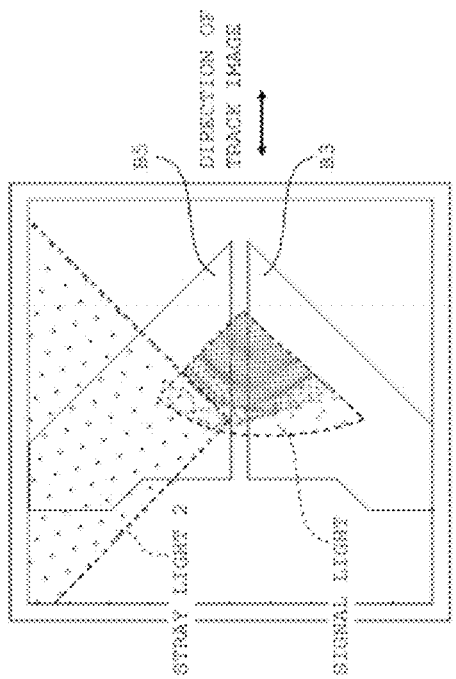

FIG. 14A is a diagram showing a state as to how BD light reflected on a certain recording layer in a disc is converged. FIG. 14B is a schematic diagram showing the irradiation areas a0, h0, in the case where the light receiving surface (sensors B1 through B8) of the photodetector 120 is positioned at the positions Pos1 through Pos5, with respect to the convergence range shown in FIG. 14A. The hatched portions of the vertex portions of the irradiation areas a0, h0 shown in FIG. 14B indicate an area where signal light is removed by the diffraction areas 118e, 118l of the spectral element 118. Specifically, in the case where the spectral element H is used in place of the spectral element 118, BD light passing through the light flux areas a, h is irradiated onto an area formed by adding the hatched portions to the broken-line portions.

As shown in FIG. 14B, in the case where the light receiving surface lies within the convergence range (Pos1, Pos2), the irradiation areas a0, h0 are positioned within the area of the sensors B1 and B2. In the case where the light receiving surface is out of the convergence range (Pos4, Pos5), as shown in FIG. 13B, the irradiation areas a0, h0 are positioned on the outside of the sensors B1 and B2. In the case where the light receiving surface is near the focal line position in the flat surface direction (Pos2, Pos4), the irradiation areas a0, h0 have a configuration with a long size in the curved surface direction and a short size in the flat surface direction. In the case where the light receiving surface is at the focal line position in the flat surface direction (Pos3), the irradiation areas a0, h0 have a linear shape extending in the curved surface direction.

In the above arrangement, the sum of output signals from the sensors P11 and P12 in the case where the light receiving surface lies on the outside of the convergence range is smaller than the sum of output signals from the sensors P11 and P12 in the case where the light receiving surface lies on the inside of the convergence range. Further, as shown by Pos4, Pos5 in FIG. 14B, the width of a light blocking portion in the flat surface direction is increased, as the light receiving surface is shifted away from the convergence range, and the irradiation areas a0, h0 are shifted away from the sensor B2. As a result, in the case where the light receiving surface is shifted away from the convergence range, as compared with the case where the spectral element H is used, the intensity of light to be irradiated onto the sensors P11, P12 is rapidly reduced, which makes it easy to make the sum of output signals from the sensors P11 and P12 closer to zero.

Similarly to the above, in the case where the light receiving surface is shifted away from the convergence range, the above arrangement also makes it easy to make the sum of output signals from the sensors P13 and P15, the sensors P14 and P16, the sensors P17 and 18 closer to zero. Accordingly, in the case where the light receiving surface is shifted away from the convergence range, it is easy to make the sum (a SUM signal) of output signals from the sensors B1 through B8 closer to zero.

FIG. 15A is a schematic diagram showing a SUM signal, in the case where the position of the light receiving surface (sensors B1 through B8) of the photodetector is shifted from the convergence range of reflected light on a certain recording layer in a disc. The broken line in FIG. 15A is a schematic diagram showing a SUM signal, in the case where the spectral element H is used.

Referring to FIG. 15A, in the case where the light receiving surface lies within the convergence range, the irradiation areas a0 through h0 are positioned on the sensors B1 through B8, and the SUM signal is kept substantially constant. In the case where the light receiving surface is out of the convergence range, since the irradiation areas a0 through h0 are positioned on the outside of the sensors B1 through B8, the SUM signal to be obtained when the light receiving surface lies on the outside of the convergence range is smaller than the SUM signal to be obtained when the light receiving surface lies within the convergence range. The SUM signal to be obtained in the above case is reduced in accordance with the light amount of light to be separated and irradiated onto the outside of the sensors B1 through B8 by the diffraction areas 118e through 118l, as compared with the SUM signal (indicated by the broken line) to be obtained in the case where the spectral element H is used.

As described above, in the case where the light receiving surface is shifted away from the convergence range, it is easy to make the SUM signal closer to zero. Accordingly, as shown in FIG. 15A, the SUM signal to be obtained in the case where the light receiving surface lies on the outside of the convergence range has a sharper slope, as compared with the case where the spectral element H is used.

FIG. 15B is a schematic diagram showing a state that the convergence ranges of plural recording layers are adjacent to each other, and the SUM signal shown in FIG. 15A is overlapped. As shown in FIG. 15A, the SUM signal to be obtained in the case where the light receiving surface lies on the outside of the convergence range has a sharp slope. Accordingly, a fall of an overlapped SUM signal as shown in FIG. 15B is large, as compared with the case where the spectral element H is used. Thus, the above arrangement makes it easy to determine a recording layer.

Next, an S-shaped curve in the inventive example is described.

Referring back to FIG. 14B, in the case where the light receiving surface of the photodetector is shifted from Pos1 to Pos3, the output signal from the sensor B1 as a plus component of a focus error signal FE is increased, and the output signal from the sensor B2 as a minus component of the focus error signal FE is decreased. In this case, since the width of a light blocking portion in the curved surface direction is increased, the irradiation area on the sensor B2 is more rapidly decreased, as compared with the case where the spectral element H is used. As a result, a value obtained by subtracting an output signal of the sensor B2 from an output signal of the sensor B1 is gradually increased, and becomes maximal before the light receiving surface reaches Pos3. Further, in the case where the light receiving surface of the photodetector is shifted from Pos3 to Pos4, the output signal from the sensor B1 as a plus component of a focus error signal FE is more rapidly decreased, as compared with the case where the spectral element H is used. As a result, a value obtained by subtracting an output signal of the sensor B2 from an output signal of the sensor B1 comes closer to zero more quickly, as the light receiving surface is shifted away from Pos3.

Similarly to the above, in the case where the light receiving surface is shifted from the center of the convergence range toward the focal line position in the curved surface direction, a value obtained by subtracting an output signal of the sensor B2 from an output signal of the sensor B1 becomes minimal before the light receiving surface reaches the focal line position in the flat surface direction; and after the light receiving surface passes the focal line position in the flat surface direction, a value obtained by subtracting an output signal of the sensor B2 from an output signal of the sensor B1 comes closer to zero more quickly. The same description as described above is also applied to the sensors B3 and B5, the sensors B6 and B4, the sensors B8 and B7.

As described above, in the case where the light receiving surface is on the side of the center of the convergence range than the focal line position in the flat surface direction and in the curved surface direction, a peak of an S-shaped curve is formed. Further, it is easy to make the focus error signal FE closer to zero in a range outside of the detection range of the S-shaped curve.

FIG. 15C is a diagram showing an S-shaped curve, in the case where the focus position of laser light is shifted forward and rearward of a recording layer.

As described above, in the case where the light receiving surface of the photodetector is positioned on the side of the center of the convergence range than the focal line position in the flat surface direction and in the curved surface direction, a peak of an S-shaped curve is formed. Further, as described above, in the case where the light receiving surface is shifted away from the convergence range, it is easy to make the focus error signal FE closer to zero in a range outside of the detection range. Accordingly, as shown in FIG. 15C, the focus error signal FE has a sharp slope in a range outside of the detection range.

In the case where plural recording layers are formed in proximity to each other, left and right portions of the S-shaped curve shown in FIG. 15C are overlapped with S-shaped curves of recording layers adjacent to a target recording layer. In this case, as compared with the case where the spectral element H is used, the detection range is narrow, and the focus error signal FE has a sharp slope in a range outside of the detection range. The above arrangement makes it easy to isolate the target S-shaped curve; and in performing focus servo control with respect to a target recording layer, the target S-shaped curve for focus control is less likely to be distorted resulting from an influence of the left-side or right-side S-shaped curve.

FIGS. 16A through 16D and FIGS. 17A through 17D are diagrams showing a simulation result of an irradiation area on the sensor layout, in the case where the spectral element H is used, and in the case where the spectral element 118 in the inventive example is used. In the above simulation, the width d of the spectral element 118 is set to 5% of the diameter of laser light to be entered into the spectral element 118. Further, the above simulation is made based on the premise that the BD objective lens 117 is not shifted in FIGS. 16A through 16D, and that the BD objective lens 117 is shifted by 300 µm in FIGS. 17A through 17D. Furthermore, in the above simulation, a light receiving sensor is constituted of the sensors B1 through B8 in the inventive example.

As shown in FIGS. 16A and 16B, FIGS. 17A and 17B, in the case where the spectral element H is used, the irradiation area of stray light comes close to the irradiation area of signal light. As a result, stray light is likely to be irradiated onto the sensors B1 through B8. In contrast, as shown in FIGS. 16C and 16D, FIGS. 17C and 17D, in the case where the spectral element 118 in the inventive example is used, there is no or less likelihood that stray light may be irradiated onto the sensors B1 through B8, because the irradiation area of signal light and the irradiation area of stray light are formed away from each other by diffraction on the diffraction areas 118e through 118l, as compared with the case where the spectral element H is used.

Figure 18:
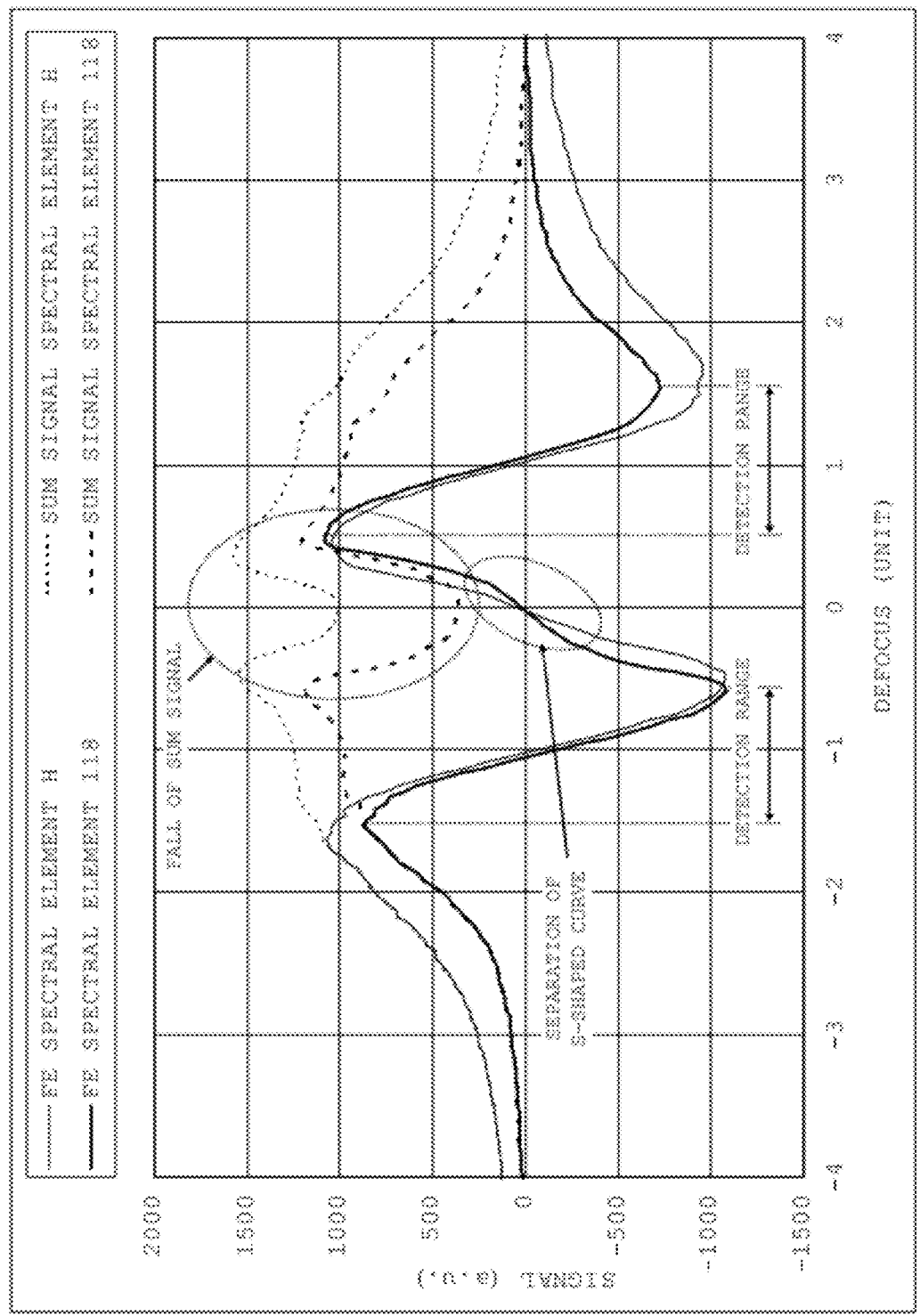
FIG. 18 is a diagram showing a simulation result, in the case where the spectral element based on the technical principle of the embodiment is used, and in the case where the spectral element in the inventive example is used.

FIG. 18 is a diagram showing a simulation result on a value of a focus error signal FE, and a sum (a SUM Signal) of output signals from the sensors B1 through B8. In the above simulation, the refractive index in a region between recording layers of a disc is set to 1.6. The horizontal axis in FIG. 18 indicates a value in accordance with a moving amount of an objective lens.

In the case where the spectral element 118 in the inventive example is used, as shown in FIG. 18, as compared with the case where the spectral element H is used, a fall of a SUM signal between adjacent recording layers is large, and the detection range of each S-shaped curve is narrow. Further, in the case where the spectral element 118 in the inventive example is used, as described above, since there is no or less likelihood that S-shaped curves of adjacent recording layers may affect the target S-shaped curve, the focus error signal FE comes closer to zero more quickly, and has a sharp slope in the target S-shaped curve. Thus, the above arrangement makes it easy to isolate the target S-shaped curve.

As described above, in the inventive example, there is no or less likelihood that stray light 1, 2 may overlap signal light of BD light, as compared with the case where the spectral element H is used. Accordingly, it is possible to enhance the precision of output signals from the sensors B1 through B8, based on signal light of BD light.

Further, in the inventive example, a fall of a SUM signal between adjacent recording layers is large, as compared with the case where the spectral element H is used. Accordingly, the above arrangement makes it easy to determine a target recording layer out of plural recording layers.

Furthermore, in the inventive example, the detection range of an S-shaped curve of a focus error signal FE is narrow, as compared with the case where the spectral element H is used. Accordingly, it is possible to quickly adjust the focus position of laser light on a target recording layer, after the laser light to be focused is guided to the target recording layer.

The example of the invention has been described as above. The invention is not limited to the foregoing example, and the example of the invention may be modified in various ways other than the above.

For instance, in the inventive example, the sensors B1 through B8 shown in FIG. 12 are disposed at such positions that the irradiation area of signal light is sufficiently included. Alternatively, the vertices on the outside of the sensors B1 through B8 may be aligned with the vertices on the outside of the irradiation area of signal light. In the above case, the sensors B1 through B8 may be configured in accordance with the irradiation area of signal light to be separated by the spectral element 118, or the diffraction angles on the diffraction areas 118a through 118d of the spectral element 118 may be adjusted in accordance with the sensors B1 through B8.

Further, in the inventive example, as shown in FIG. 11A, BD light is diffracted on diffraction areas adjacent to each other, out of the diffraction areas 118e through 118l, in a direction displaced from a flat surface direction or a straight line direction by 45°. Alternatively, the diffraction direction may be set, as necessary, in such a manner that diffracted BD light is not irradiated onto the sensors B1 through B8. Further alternatively, diffraction areas adjacent to each other, out of the diffraction areas 118e through 118l, may be integrally formed into one diffraction area. In the above case, the diffraction direction may also be set, as necessary, in such a manner that diffracted BD light is not irradiated onto the sensors B1 through B8.

Furthermore, in the inventive example, the diffraction areas 118e through 118l each having the width d are formed along the diagonal lines of the spectral element 118. Alternatively, the diffraction areas 118e through 118l may be formed with a light blocking portion where incidence of laser light is blocked. In the above case, signal light of BD light is irradiated onto the sensors B1 through B8 in the same manner as the inventive example. In this case, the light amount of CD light to be irradiated onto the four-divided sensors C01 through C03, and the light amount of DVD light to be irradiated onto the four-divided sensors D01 through D03 are reduced by the light blocking portions. In the case where the reduction in the light amount of CD light and DVD light causes a problem, the optical system for receiving BD light, and the optical system for receiving CD light and DVD light may be individually constructed.

Further, in the inventive example, BD light is separated by the spectral element 118 having a diffraction pattern on a light incident surface thereof. Alternatively, BD light may be separated by using a spectral element constituted of a multifaceted prism.

In the case where a spectral element constituted of a multifaceted prism is used, the optical system for receiving BD light, and the optical system for receiving CD light and DVD light are individually constructed. Specifically, BD light is guided to the BD objective lens 117 shown in FIG. 10B by the optical system for BD, and CD light and DVD light are guided to the dual wavelength objective lens 116 by the optical system for CD/DVD which is constructed independently of the optical system for BD. The optical system for BD has a laser light source for emitting BD light, and one photodetector for receiving BD light reflected on BD. The optical system for CD/DVD has a laser light source for emitting CD light and DVD light, and a photodetector other than the photodetector for BD light and for receiving CD light, DVD light reflected on CD, DVD. The photodetector for CD/DVD has two sensor groups for individually receiving CD light and DVD light. Similarly to the inventive example, the optical system for BD is provided with an anamorphic lens for imparting astigmatism to BD light reflected on BD. The spectral element constituted of a multifaceted prism is disposed, for example, anterior to the anamorphic lens.

Figure 19A:
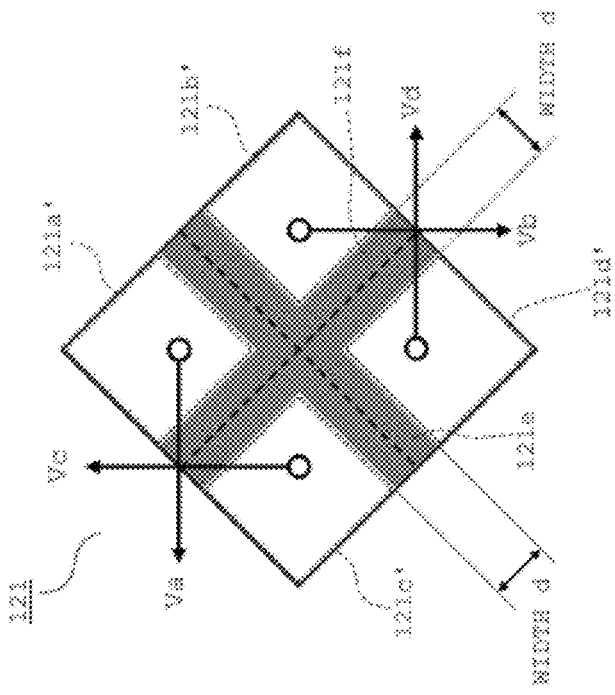
FIGS. 19A and 19B are diagrams showing a modification example of the arrangement of the spectral element in the inventive example.
Figure 19B:
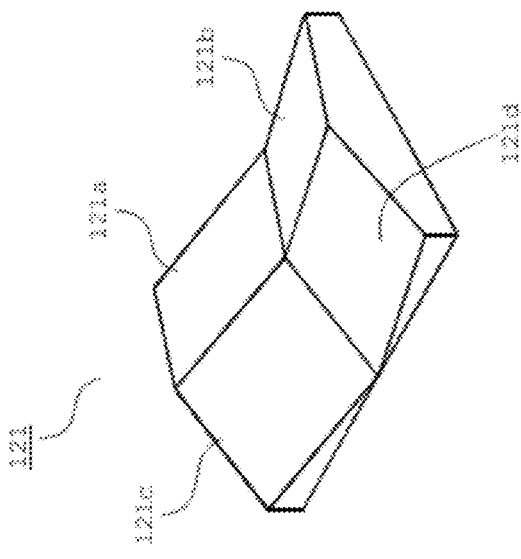

FIGS. 19A, 19B are schematic diagrams showing an arrangement of a spectral element 121 constituted of a multifaceted prism. FIG. 19A is a perspective view of the spectral element 121, and FIG. 19B is a plan view of the spectral element 121 when viewed from an incident surface thereof.

Referring to FIGS. 19A, 19B, the spectral element 121 is constituted of a multifaceted prism. Surfaces 121a through 121d each inclined in a direction different from the optical axis of BD light are formed on the incident surface of the spectral element 121. BD light is entered into the spectral element 121 in such a manner that the optical axis of BD light is aligned with the center of the spectral element 121. With this arrangement, BD light is uniformly entered into the surfaces 121a through 121d. BD light entered into the surfaces 121a through 121d is respectively refracted on the surfaces 121a through 121d in the directions Va through Vd, and the propagating directions of BD light are changed by the same angle, respectively.

Referring to FIG. 19B, the output surface of the spectral element 121 is formed with a light blocking portion 121e having a width d and formed in parallel to the flat surface direction, and a light blocking portion 121f having a width d and formed in parallel to the curved surface direction. The light blocking portions 121e, 121f are formed by e.g. attaching a light blocking mask member on a flat output surface thereof. With this arrangement, a part of BD light to be entered into the surfaces 121a through 121d is blocked by the light blocking portions 121e, 121f. Specifically, BD light to be entered into areas 121a' through 121d' in the surfaces 121a through 121d is not blocked by the light blocking portions 121e, 121f. As a result, the irradiation areas of signal light and stray light 1, 2 of BD light that have been transmitted through the spectral element 121 are formed near the signal light area, as indicated by the irradiation areas a0 through h0 shown in FIGS. 13A through 13C. In this case, the irradiation areas a1 through h1 are not formed by light blocking by the light blocking portions 121e, 121f.

In the modification example shown in FIGS. 19A, 19B, the surfaces 121a through 121d are formed on an incident surface of the spectral element 121, and the light blocking portions 121e, 121f are formed on a flat output surface of the spectral element 121. Alternatively, the surfaces 121a through 121d may be formed on an output surface of the spectral element 121, and the light blocking portions 121e, 121f may be formed on a flat incident surface of the spectral element 121. Further alternatively, a slope capable of obtaining refraction substantially equivalent to diffraction by the diffraction areas 118e through 118l of the spectral element 118 may be formed, in place of the light blocking portions 121e, 121f.

Furthermore, in the inventive example, the spectral element 118 is disposed anterior to the anamorphic lens 119. Alternatively, the spectral element 118 may be disposed posterior to the anamorphic lens 119, or a diffraction pattern for imparting the same diffraction function as the spectral element 118 to laser light may be integrally formed on an incident surface or an output surface of the anamorphic lens 119.

The embodiment of the invention may be changed or modified in various ways as necessary, as far as such changes and modifications do not depart from the scope of the claims of the invention hereinafter defined.

What is claimed is:

1. An optical pickup device, comprising:
   a light source which emits laser light;
   an objective lens which focuses the laser light on a recording layer;
   an astigmatism element which imparts astigmatism to reflected light of the laser light reflected on the recording layer;
   a spectral element into which the reflected light is entered, and which separates the reflected light; and
   a photodetector which receives the reflected light, wherein
   the astigmatism element converges the reflected light in a first direction and in a second direction perpendicular to the first direction so that the reflected light forms focal lines at different positions from each other, and
   the spectral element is divided into four third areas by a first area having a certain width and formed along a straight line in parallel to the first direction, and by a second area having a certain width and formed along a straight line in parallel to the second direction, the spectral element being configured to guide the reflected light passing through the four third areas to respective corresponding sensors on the photodetector while making propagating directions of the reflected light different from each other, and to avoid guiding the reflected light entered into the first area and into the second area to the sensors.

2. The optical pickup device according to claim 1, wherein the spectral element guides the reflected light passing through the four third areas to positions of four different vertices of a rectangle, on a light receiving surface of the photodetector.

3. The optical pickup device according to claim 1, wherein the spectral element propagates the reflected light to be entered into each of areas obtained by dividing the first area into two parts by the straight line in parallel to the first direction, in directions different from each other, and propagates the reflected light to be entered into each of areas obtained by dividing the second area into two parts by the straight line in parallel to the second direction, in directions different from each other.

4. The optical pickup device according to claim 3, wherein the spectral element is configured to propagate the reflected light to be entered into each of the two areas of the first area in directions different from each other and in parallel to the second direction, and to propagate the reflected light to be entered into each of the two areas of the second area in directions different from each other and in parallel to the first direction.

5. The optical pickup device according to claim 3, wherein an angle by which the first area changes the propagating direction of the reflected light and an angle by which the second area changes the propagating direction of the reflected light are set larger than an angle by which the third area changes the propagating direction of the reflected light.

6. The optical pickup device according to claim 1, wherein the first area and the second area are so configured as to block the reflected light.

\* \* \* \* \*